US012624159B2

(12) United States Patent
Azuma et al.

(10) Patent No.: US 12,624,159 B2
(45) **Date of Patent: *May 12, 2026**

(54) POLYARYLATE RESIN AND ELECTROPHOTOGRAPHIC PHOTOSENSITIVE MEMBER

(71) Applicant: KYOCERA Document Solutions Inc., Osaka (JP)

(72) Inventors: Jun Azuma, Osaka (JP); Keiji Maruo, Osaka (JP); Kenji Kitaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 466 days.

This patent is subject to a terminal disclaimer.

(21) Appl. No.: 18/262,143

(22) PCT Filed: Jan. 19, 2022

(86) PCT No.: PCT/JP2022/001783

§ 371 (c)(1),
(2) Date: Jul. 19, 2023

(87) PCT Pub. No.: WO2022/163463

PCT Pub. Date: Aug. 4, 2022

(65) Prior Publication Data

US 2024/0117109 A1 Apr. 11, 2024

(30) Foreign Application Priority Data

Jan. 26, 2021 (JP) ................................ 2021-010148

(51) Int. Cl.
*G03G 9/087* (2006.01)
*C08G 63/187* (2006.01)
(Continued)

(52) U.S. Cl.
CPC ........... *C08G 63/187* (2013.01); *G03G 5/043* (2013.01); *G03G 15/6597* (2013.01); *G03G 2215/00518* (2013.01)

(58) Field of Classification Search
CPC ........... G03G 5/14752; G03G 5/14756; G03G 5/06142; G03G 5/06144; G03G 5/061446; C08L 67/02
See application file for complete search history.

(56) References Cited

U.S. PATENT DOCUMENTS

2022/0397835 A1* 12/2022 Shimizu ............... G03G 5/0651
2022/0413404 A1* 12/2022 Shimizu .................. C07C 50/12

FOREIGN PATENT DOCUMENTS

JP H10-020514 A 1/1998

* cited by examiner

*Primary Examiner* — Peter L Vajda
(74) *Attorney, Agent, or Firm* — Studebaker Brackett PLLC

(57) ABSTRACT

A polyarylate resin includes repeating units represented by formulas (1), (2), (3), and (4). A percentage of the number of repeats of the repeating unit represented by formula (3) relative to the total number of repeats of the respective repeating units represented by formulas (1) and (3) is greater than 0% and less than 20%. In formula (1), $R^1$ and $R^2$ each represent, independently of one another, a hydrogen atom or a methyl group and X represents a divalent group represented by formula (X1) or (X2). In formula (2), W represents, a divalent group represented by formula (W1) or (W2).

(Continued)

[Chemical Formula 1]
(1)
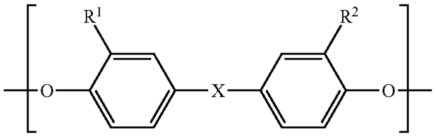
(2)
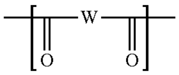
(3)
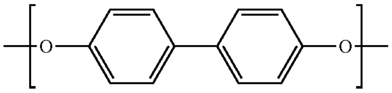
(4)
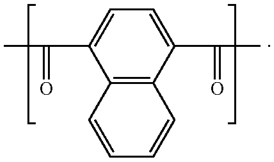
[Chemical Formula 2]
(X1)
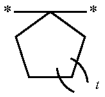
-continued
(X2)
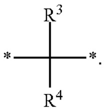
[Chemical Formula 3]
(W1)
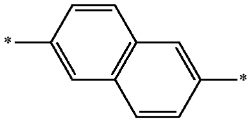
(W2)
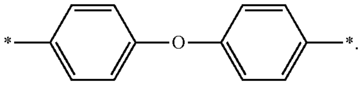
12 Claims, 3 Drawing Sheets
(51) Int. Cl.
*G03G 5/043* (2006.01)
*G03G 15/00* (2006.01)

POLYARYLATE RESIN AND ELECTROPHOTOGRAPHIC PHOTOSENSITIVE MEMBER

TECHNICAL FIELD

The present invention relates to a polyarylate resin and an electrophotographic photosensitive member.

BACKGROUND ART

Electrophotographic photosensitive members are used as image bearing members in electrographic image forming apparatuses (e.g., printers and multifunction peripherals). An electrophotographic photosensitive member includes a photosensitive layer. Examples of the electrophotographic photosensitive member include a single-layer electrophotographic photosensitive member and a multi-layer electrophotographic photosensitive member. The single-layer electrophotographic photosensitive member includes a single-layer photosensitive layer having a charge generation function and an electrical charge transport function. The multi-layer electrophotographic photosensitive member includes a photosensitive layer including a charge generating layer having a charge generation function and a charge transport layer having a charge transport function.

Patent Literature 1 discloses an electrophotographic photosensitive member including a surface layer containing a polyarylate resin obtained from a divalent phenol component and a divalent carboxylic acid component represented by the following formula.

[Chemical Formula 1]

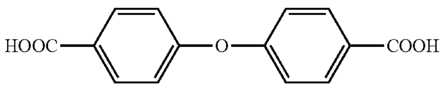

CITATION LIST

Patent Literature

Patent Literature 1
Japanese Patent Application Laid-Open Publication No. 10-20514

SUMMARY OF INVENTION

Technical Problem

However, the electrophotographic photosensitive member disclosed in Patent Literature 1 has insufficient abrasion resistance. Furthermore, the present inventors studied to find that the electrophotographic photosensitive member disclosed in Patent Literature 1 also has insufficient solubility of a binder resin in a solvent and insufficient sensitivity after repetition of charging and light exposure.

The present invention has been made in view of the foregoing and has its object of providing a polyarylate resin that has excellent solubility in a solvent and that increases sensitivity and abrasion resistance after repetition of charging and light exposure of an electrophotographic photosensitive member when a photosensitive layer thereof contains the polyarylate resin. In the following, "sensitivity after repetition of charging and light exposure" may be referred to as "repetitive sensitivity". Furthermore, another object of the present invention is to provide an electrophotographic photosensitive member that includes a favorably formed photosensitive layer and that has excellent abrasion resistance and repetitive sensitivity.

Solution to Problem

A polyarylate resin according to the present invention includes repeating units represented by formulas (1), (2), (3) and (4). A percentage of a number of repeats of the repeating unit represented by the formula (3) relative to a total number of repeats of the respective repeating units represented by the formulas (1) and (3) is greater than 0% and less than 20%.

[Chemical Formula 2]

(1)

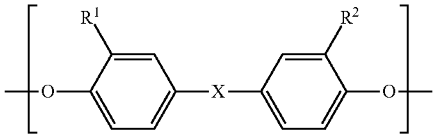

(2)

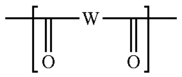

(3)

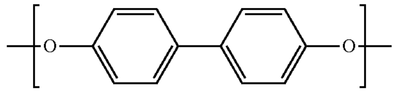

(4)

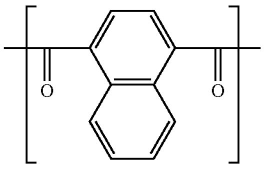

In the formula (1), $R^1$ and $R^2$ each represent, independently of one another, a hydrogen atom or a methyl group and X represents a divalent group represented by formula (X1) or (X2). In the formula (2), W represents a divalent group represented by formula (W1) or (W2).

[Chemical Formula 3]

(X1)

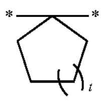

(X2)

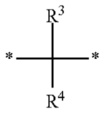

In the formula (X1), t represents an integer of at least 1 and no greater than 3 and * represents a bond. In the formula (X2), $R^3$ and $R^4$ each represent a hydrogen atom or an alkyl group with a carbon number of at least 1 and no greater than 4, $R^3$ and $R^4$ represent groups different from each other, and * represents a bond.

[Chemical Formula 4]

(W1)

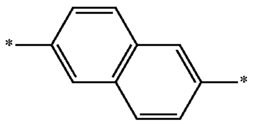

(W2)

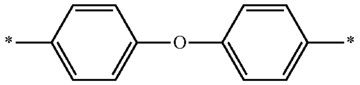

In the formulas (W1) and (W2), * represents a bond.

An electrophotographic photosensitive member according to the present invention includes a conductive substrate and a photosensitive layer. The photosensitive layer contains a charge generating material, a hole transport material, and a binder resin. The binder resin includes the aforementioned polyarylate resin.

Advantageous Effects of Invention

The polyarylate resin of the present invention has excellent solubility in a solvent and can increase repetitive sensitivity and abrasion resistance of an electrophotographic photosensitive member when a photosensitive layer thereof contains the polyarylate resin. The electrophotographic photosensitive member of the present invention can have a favorably formed photosensitive layer and is excellent in repetitive sensitivity and abrasion resistance.

DESCRIPTION OF EMBODIMENTS

Figure 1:
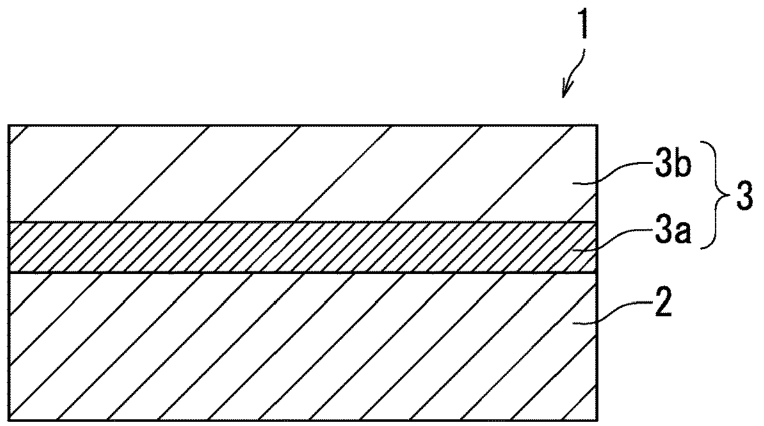
FIG. 1 is a partial cross-sectional view of a multi-layer electrophotographic photosensitive member that is an example of an electrophotographic photosensitive member according to a second embodiment of the present invention.

The following describes embodiments of the present invention in detail. Note that the present invention is not limited to any of the following embodiments and can be practiced within a scope of objects of the present invention with alterations made as appropriate. Although some overlapping explanations may be omitted as appropriate, such omission does not limit the gist of the present invention. In the following description, the term "-based" may be appended to the name of a chemical compound to form a generic name encompassing both the chemical compound itself and derivatives thereof. When the term "-based" is appended to the name of a chemical compound to represent the name of a polymer, the term indicates that a repeating unit of the polymer originates from the chemical compound or a derivative thereof. Both "general formula" and "chemical formula" are referred collectively to as "formula". The phrase "each represent, independently of one another" in the explanation of a formula means representing the same group as each other or representing of groups different from each other. One type of a component indicated in the present specification may be used independently, or any two or more types of the component may be used in combination unless otherwise stated.

The substituents used in the present specification will be described first. An alkyl group with a carbon number of at least 1 and no greater than 8, an alkyl group with a carbon number of at least 1 and no greater than 6, an alkyl group with a carbon number of at least 1 and no greater than 4, an alkyl group with a carbon number of at least 1 and no greater than 3, and an alkyl group with a carbon number of 3 each are an unsubstituted straight chain or branched chain alkyl group unless otherwise stated. Examples of the alkyl group with a carbon number of at least 1 and no greater than 8 include a methyl group, an ethyl group, an n-propyl group, an isopropyl group, an n-butyl group, a sec-butyl group, a tert-butyl group, an n-pentyl group, a 1-methylbutyl group, a 2-methylbutyl group, a 3-methylbutyl group, a 1-ethylpropyl group, a 2-ethylpropyl group, a 1,1-dimethylpropyl group, a 1,2-dimethylpropyl group, a 2,2-dimethylpropyl group, an n-hexyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 3,3-dimethylbutyl group, a 1,1,2-trimethylpropyl group, a 1,2,2-trimethylpropyl group, a 1-ethylbutyl group, a 2-ethylbutyl group, a 3-ethylbutyl group, a straight chain or branched chain heptyl group, and a straight chain or branched chain octyl group. Examples of the alkyl group with a carbon number of at least 1 and no greater than 6, the alkyl group with a carbon number of at least 1 and no greater than 4, the alkyl group with a carbon number of at least 1 and no greater than 3, and the alkyl group with a carbon number of 3 include groups with corresponding carbon numbers among the groups listed as the examples of the alkyl group with a carbon number of at least 1 and no greater than 8.

A perfluoroalkyl group with a carbon number of at least 1 and no greater than 10, a perfluoroalkyl group with a carbon number of at least 3 and no greater than 10, a perfluoroalkyl group with a carbon number of at least 5 and no greater than 7, and a perfluoroalkyl group with a carbon number of 6 each are an unsubstituted straight chain or branched chain perfluoroalkyl group unless otherwise stated. Examples of the perfluoroalkyl group with a carbon number of at least 1 and no greater than 10 include a trifluoromethyl group, a perfluoroethyl group, a perfluoro-n-propyl group, a perfluoroisopropyl group, a perfluoro-n-butyl group, a perfluoro-sec-butyl group, a perfluoro-tert-butyl group, a perfluoro-n-pentyl group, a perfluoro-1-methylbutyl group, a perfluoro-2-methylbutyl group, a perfluoro-3-methylbutyl group, a perfluoro-1-ethylpropyl group, a perfluoro-2-ethylpropyl group, a perfluoro-1,1-dimethylpropyl group, a perfluorol, 2-dimethylpropyl group, a perfluoro-2,2-dimethylpropyl group, a perfluoro-n-hexyl group, a perfluoro-1-methylpentyl group, a perfluoro-2-methylpentyl group, a perfluoro-3-methylpentyl group, a perfluoro-4-methylpentyl group, a perfluoro-1,1-dimethylbutyl group, a perfluoro-1, 2-dimethylbutyl group, a perfluoro-1,3-dimethylbutyl group, a perfluoro-2,2-dimethylbutyl group, a perfluoro-2, 3-dimethylbutyl group, a perfluoro-3,3-dimethylbutyl group, a perfluoro-1,1,2-trimethylpropyl group, a perfluoro-1,2,2-trimethylpropyl group, a perfluoro-1-ethylbutyl group, a perfluoro-2-ethylbutyl group, a perfluoro-3-ethylbutyl group, a straight chain or branched chain perfluoroheptyl group, a straight chain or branched chain perfluorooctyl group, a straight chain or branched chain perfluorononyl group, and a straight chain or branched chain perfluorodecyl group. Examples of the perfluoroalkyl group with a carbon number of at least 3 and no greater than 10, the perfluoroalkyl group with a carbon number of at least 5 and no greater than 7, and the perfluoroalkyl group with a carbon number of 6 include groups with corresponding carbon numbers among the groups listed as the examples of the perfluoroalkyl group with a carbon number of at least 1 and no greater than 10.

An alkoxy group with a carbon number of at least 1 and no greater than 8 and an alkoxy group with a carbon number of at least 1 and no greater than 3 each are an unsubstituted straight chain or branched chain alkoxy group unless otherwise stated. Examples of the alkoxy group with a carbon number of at least 1 and no greater than 8 include a methoxy group, an ethoxy group, an n-propoxy group, an isopropoxy group, an n-butoxy group, a sec-butoxy group, a tert-butoxy group, an n-pentoxy group, a 1-methylbutoxy group, a 2-methylbutoxy group, a 3-methylbutoxy group, a 1-ethylpropoxy group, a 2-ethylpropoxy group, a 1,1-dimethylpropoxy group, a 1,2-dimethylpropoxy group, a 2,2-dimethylpropoxy group, an n-hexyloxy group, a 1-methylpentyloxy group, a 2-methylpentyloxy group, a 3-methylpentyloxy group, a 4-methylpentyloxy group, a 1,1-dimethylbutoxy group, a 1,2-dimethylbutoxy group, a 1,3-dimethylbutoxy group, a 2,2-dimethylbutoxy group, a 2,3-dimethylbutoxy group, a 3,3-dimethylbutoxy group, a 1,1,2-trimethylpropoxy group, a 1,2,2-trimetylpropoxy group, a 1-ethylbutoxy group, a 2-ethylbutoxy group, a 3-ethylbutoxy group, a straight chain or branched chain heptyloxy group, and a straight chain or branched chain octyloxy group. Examples of the alkoxy group with a carbon number of at least 1 and no greater than 3 include groups with corresponding carbon numbers among the groups listed as the examples of the alkoxy group with a carbon number of at least 1 and no greater than 8.

A cycloalkane with a carbon number of at least 5 and no greater than 7 is an unsubstituted cycloalkane unless otherwise stated. Examples of the cycloalkane with a carbon number of at least 5 and no greater than 7 include cyclopentane, cyclohexane, and cycloheptane. The substituents used in the present specification have been described so far.

First Embodiment: Polyarylate Resin

A first embodiment of the present invention relates to a polyarylate resin. The polyarylate resin of the first embodiment includes repeating units represented by formulas (1), (2), (3) and (4). A percentage of the number of repeats of the repeating unit represented by formula (3) relative to a total number of repeats of the respective repeating units represented by formulas (1) and (3) is greater than 0% and less than 20%.

[Chemical Formula 5]

(1)

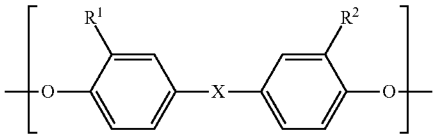

(2)

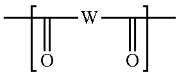

(3)

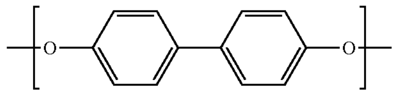

(4)

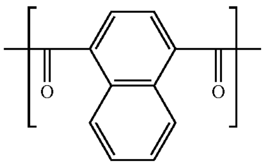

In formula (1), $R^1$ and $R^2$ each represent, independently of one another, a hydrogen atom or a methyl group, and X represents a divalent group represented by formula (X1) or (X2). In formula (2), W represents a divalent group represented by formula (W1) or (W2).

[Chemical Formula 6]

(X1)

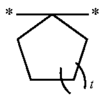

(X2)

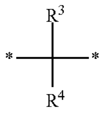

In formula (X1), t represents an integer of at least 1 and no greater than 3 and * represents a bond. In formula (X2), $R^3$ and $R^4$ each represent a hydrogen atom or an alkyl group with a carbon number of at least 1 and no greater than 4, $R^3$ and $R^4$ represent groups different from each other, and * represents a bond.

[Chemical Formula 7]

(W1)

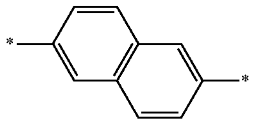

-continued (W2)

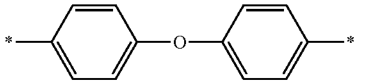

In formulas (W1) and (W2), * represents a bond.

In the following, the repeating units represented by formulas (1), (2), (3), and (4) may be referred to as "repeating units (1), (2), (3), and (4)", respectively. Also, the percentage of the number of repeats of the repeating unit (3) relative to the total number of repeats of the respective repeating units (1) and (3) may be referred to as "percentage content (3)". In addition, a polyarylate resin including the repeating units (1), (2), (3) and (4) and having a percentage content (3) of greater than 0% and less than 20% may be referred to as "polyarylate resin (PA)".

The polyarylate resin (PA) essentially includes the repeating units (1), (2), (3) and (4). As a result of including the repeating units as above, the polyarylate resin (PA) has excellent solubility in a solvent and can increase repetitive sensitivity and abrasion resistance of an electrophotographic photosensitive member (also referred to below as photosensitive member) when a photosensitive layer thereof contains the polyarylate resin (PA).

The percentage content (3) is a percentage (i.e., $100\times N_3/(N_1+N_3)$) of a number $N_3$ of repeats of the repeating unit (3) relative to the total of a number $N_1$ of repeats of the repeating unit (1) and the number $N_3$ of repeats of the repeating unit (3) in the polyarylate resin (PA). As a result of the percentage content (3) being less than 20%, the polyarylate resin (PA) can have increased solubility in a solvent. As a result of the percentage content (3) being greater than 0%, that is, as a result of the percentage content (3) being not 0%, a photosensitive member can have increased repetitive sensitivity and abrasion resistance when a photosensitive layer thereof contains the polyarylate resin (PA). The percentage content (3) is preferably at least 1%, more preferably at least 5%. Also, the percentage content (3) is preferably no greater than 19%, more preferably no greater than 10%.

The percentage of the number of repeats of the repeating unit (4) relative to the total number of repeats of the respective repeating units (2) and (4) is greater than 0% and less than 100%. The percentage of the number of repeats of the repeating unit (4) relative to the total number of repeats of the respective repeating units (2) and (4) may be referred to as "percentage content (4)". The percentage content (4) is a percentage (i.e., $100\times N_4/(N_2+N_4)$) of a number $N_4$ of repeats of the repeating unit (4) relative to the total of a number $N_2$ of repeats of the repeating unit (2) and the number $N_4$ of repeats of the repeating unit (4) in the polyarylate resin (PA). The percentage content (4) is greater than 0%, that is, not 0%. Accordingly, the polyarylate resin (PA) includes the repeating unit (4). As a result of the polyarylate resin (PA) including the repeating unit (4), the polyarylate resin has improved solubility in a solvent. Accordingly, a photosensitive member can have increased repetitive sensitivity and abrasion resistance when a photosensitive layer thereof contains the polyarylate resin (PA). By contrast, the percentage content (4) is less than 100%, that is, not 100%. Accordingly, the polyarylate resin (PA) includes the repeating unit (2). As a result of the polyarylate resin (PA) including the repeating unit (2), a photosensitive member can have increased abrasion resistance when a photosensitive layer thereof contains the polyarylate resin (PA). The percentage content (4) is preferably at least 1%, more preferably at least 10%, further preferably at least 35%. The percentage content (4) is preferably no greater than 99%, more preferably no greater than 80%, further preferably no greater than 65%.

The percentage contents (3) and (4) can each be calculated from a ratio of characteristic peaks of the respective repeating units of the polyarylate resin (PA) in a $^1$H-NMR spectrum plotted using a proton nuclear magnetic resonance spectrometer.

Preferably, $R^1$ and $R^2$ in formula (1) each represent a methyl group.

Preferably, t in formula (X1) represents 2.

In formula (X2), preferably, $R^3$ represents a hydrogen atom and $R^4$ represents a methyl group, an ethyl group, or an alkyl group with a carbon number of 3; $R^3$ represents a methyl group and $R^4$ represents an ethyl group or an alkyl group with a carbon number of 3; or $R^3$ represents an ethyl group and $R^4$ represents an alkyl group with a carbon number of 3. More preferably, $R^3$ represents a methyl group and $R^4$ represents an ethyl group.

The bond represented by * in formulas (X1) and (X2) is bonded to a carbon atom to which X in formula (1) is bonded. Each bond represented by * in formulas (W1) and (W2) is bonded to a carbon atom to which W in formula (2) is bonded.

Examples of the repeating unit (1) include repeating units represented by formulas (1-1), (1-2), and (1-3) (also referred to below as repeating units (1-1), (1-2) and (1-3), respectively).

[Chemical Formula 8]

(1-1)

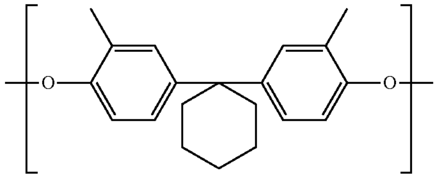

(1-2)

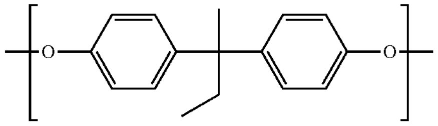

(1-3)

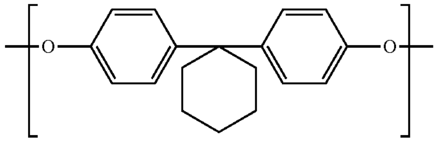

Examples of the repeating unit (2) include repeating units represented by formula (2-1) or (2-2) (also referred to below as repeating units (2-1) and (2-2), respectively).

[Chemical Formula 9]

(2-1)

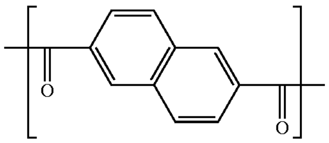

-continued (2-2)

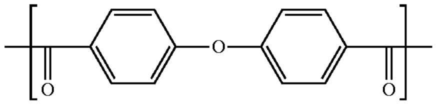

In one embodiment, it is preferable in formula (1) that $R^1$ and $R^2$ each represent a methyl group and X represents a divalent group represented by formula (X1). More preferably, the repeating unit (1) is the repeating unit (1-1). Further preferably, the repeating unit (1) is the repeating unit (1-1), and the repeating unit (2) is the repeating unit (2-1); or the repeating unit (1) is the repeating unit (1-1), and the repeating unit (2) is the repeating unit (2-2).

In another embodiment, it is preferable in formula (1) that $R^1$ and $R^2$ each represent a hydrogen atom and X represents a divalent group represented by formula (X2). More preferably, the repeating unit (1) is the repeating unit (1-2). Further preferably, the repeating unit (1) is the repeating unit (1-2), and the repeating unit (2) is the repeating unit (2-1); or the repeating unit (1) is the repeating unit (1-2), and the repeating unit (2) is the repeating unit (2-2). The photosensitive member can exhibit further excellent abrasion resistance when the photosensitive layer thereof contains the polyarylate resin (PA) described above.

The polyarylate resin (PA) may have an end group. Examples of the end group of the polyarylate resin (PA) include end groups represented by formulas (T-1) and (T-2). The end group represented by formula (T-1) is preferably an end group represented by formula (T-DMP) (also referred to below as end group (T-DMP)). The end group represented by formula (T-2) is preferably an end group represented by formula (T-PFH) (also referred to below as end group (T-PFH)).

[Chemical Formula 10]

(T-1)

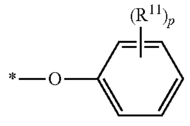

(T-2)

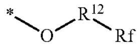

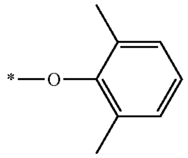

(T-DMP)

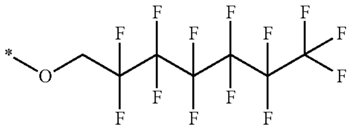

(T-PFH)

In formula (T-1), $R^{11}$ represents a halogen atom or an alkyl group with a carbon number of at least 1 and no greater than 6 and p represents an integer of at least 0 and no greater than 5. $R^{11}$ preferably represents an alkyl group with a carbon number of at least 1 and no greater than 6, more preferably represents an alkyl group with a carbon number of at least 1 and no greater than 3, and further preferably represents a methyl group. p preferably represents an integer of at least 1 and no greater than 3, and more preferably represents 2.

In formula (T-2), $R^{12}$ represents an alkanediyl group with a carbon number of at least 1 and no greater than 6 and Rf represents a perfluoroalkyl group with a carbon number of at least 1 and no greater than 10. $R^{12}$ preferably represents an alkanediyl group with a carbon number of at least 1 and no greater than 3, and more preferably represents a methylene group. Rf preferably represents a perfluoroalkyl group with a carbon number of at least 3 and no greater than 10, more preferably represents a perfluoroalkyl group with a carbon number of at least 5 and no greater than 7, and further preferably represents a perfluoroalkyl group with a carbon number of 6.

In each of formulas (T-1), (T-2), (T-DMP), and (T-PFH), * represents a bond. The bond represented by * in each of formulas (T-1), (T-2), (T-DMP), and (T-PFH) is bonded to a repeating unit (more specifically, a repeating unit (2) or (4)) derived from dicarboxylic acid located at the end of the polyarylate resin (PA).

Preferable examples of the polyarylate resin (PA) include polyarylate resins (PA-1) to (PA-4) shown in Table 1. The polyarylate resins (PA-1) to (PA-4) include respective repeating units shown in Table 1 as the repeating units (1) to (4). In Table 1 and Table 2, Units (1) to (4) means the repeating units (1) to (4), respectively.

TABLE 1

| Polyarylate resin | Unit (1) | Unit (2) | Unit (3) | Unit (4) |
|---|---|---|---|---|
| PA-1 | 1-1 | 2-1 | 3 | 4 |
| PA-2 | 1-2 | 2-1 | 3 | 4 |
| PA-3 | 1-1 | 2-2 | 3 | 4 |
| PA-4 | 1-2 | 2-2 | 3 | 4 |

Further preferable examples of the polyarylate resin (PA) include polyarylate resins (PA-a) to (PA-h) shown in Table 2. The polyarylate resins (PA-a) to (PA-h) have respective end groups shown in Table 2 and include respective repeating units shown in Table 2 as the repeating units (1) to (4).

TABLE 2

| Polyarylate resin | Unit (1) | Unit (2) | Unit (3) | Unit (4) | End group |
|---|---|---|---|---|---|
| PA-a | 1-1 | 2-1 | 3 | 4 | T-DMP |
| PA-b | 1-2 | 2-1 | 3 | 4 | T-DMP |
| PA-c | 1-1 | 2-2 | 3 | 4 | T-DMP |
| PA-d | 1-2 | 2-2 | 3 | 4 | T-DMP |
| PA-e | 1-1 | 2-1 | 3 | 4 | T-PFH |
| PA-f | 1-2 | 2-1 | 3 | 4 | T-PFH |
| PA-g | 1-1 | 2-2 | 3 | 4 | T-PFH |
| PA-h | 1-2 | 2-2 | 3 | 4 | T-PFH |

In the polyarylate resin (PA), a repeating unit (specifically, the repeating unit (1) or (3)) derived from bisphenol and a repeating unit (specifically, the repeating unit (2) or (4)) derived from dicarboxylic acid are adjacent and bonded to each other. That is, the repeating unit (1) may be bonded to the repeating unit (2) or the repeating unit (4). Furthermore, the repeating unit (3) may be bonded to the repeating unit (2) or the repeating unit (4). The repeating unit derived from bisphenol and the repeating unit derived from dicarboxylic acid are substantially the same as each other in number of repeats, and satisfy a calculation formula "number of repeats of repeating unit derived from dicarboxylic acid=number of repeats of repeating unit derived from bisphenol+1". The polyarylate resin (PA) may be a random copolymer, an alternating copolymer, a periodic copolymer, or a block copolymer, for example.

The polyarylate resin (PA) may include only one repeating unit (1) or may include two or more (for example, two) repeating units (1) as the repeating unit (1). The polyarylate resin (PA) may include only one repeating unit (2) or may include two repeating units (2) as the repeating unit (2).

The polyarylate resin (PA) may further include a repeating unit other than the repeating units (1) to (4) as a repeating unit. However, in order to increase solubility in a solvent and increase repetitive sensitivity and abrasion resistance of a photosensitive member when a photosensitive layer thereof contains the polyarylate resin (PA), the percentage of the total number of repeats of the repeating units (1) to (4) relative to the total number of repeats of all repeating units included in the polyarylate resin (PA) is preferably at least 90%, more preferably at least 95%, further preferably 99%, and particularly preferably 100%. That is, the polyarylate resin (PA) particularly preferably includes only the repeating units (1) to (4) as a repeating unit.

In order to improve solubility of the polyarylate resin (PA) in a solvent, the percentage of number of repeats of the repeating unit (3) relative to the total number of repeats of all repeating units derived from bisphenol in the polyarylate resin (PA) is preferably no greater than 20%, and more preferably less than 20%.

The polyarylate resin (PA) has a viscosity average molecular weight of preferably at least 10,000, more preferably at least 30,000, further preferably at least 50,000, and particularly preferably at least 55,000. As a result of the polyarylate resin (PA) having a viscosity average molecular weight of at least 10,000, a photosensitive member can have increased abrasion resistance when a photosensitive layer thereof contains the polyarylate resin (PA). By contrast, the polyarylate resin (PA) has a viscosity average molecular weight of preferably no greater than 80,000, more preferably no greater than 70,000, and further preferably no greater than 60,000. As a result of the polyarylate resin (PA) having a viscosity average molecular weight of no greater than 80,000, solubility of the polyarylate resin (PA) in a solvent can be increased. The viscosity average molecular weight of the polyarylate resin (PA) is measured in accordance with the Japanese Industrial Standards (JIS) K7252-1:2016.

A production method of the polyarylate resin (PA) will be described next. An example of the production method of the polyarylate resin (PA) is condensation polymerization of bisphenol for forming a repeating unit derived from bisphenol and dicarboxylic acid for forming a repeating unit derived from dicarboxylic acid. Any known synthesis method (e.g., solution polymerization, melt polymerization, or interface polymerization) can be employed as condensation polymerization.

Examples of the bisphenol for forming a repeating unit derived from bisphenol include compounds represented by formulas (BP-1) and (BP-3) (also referred to below as compounds (BP-1) and (BP-3), respectively). Examples of the dicarboxylic acid for forming a repeating unit derived from dicarboxylic acid include compounds represented by formulas (DC-2) and (DC-4) (also referred to below as compounds (DC-2) and (DC-4), respectively). $R^1$, $R^2$, and X in formula (BP-1) are respectively the same as defined for $R^1$, $R^2$, and X in formula (1). W in formula (DC-2) is the same as defined for W in formula (2).

[Chemical Formula 11]

(BP-1)

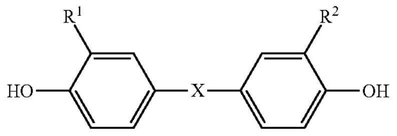

(DC-2)

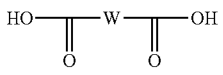

(BP-3)

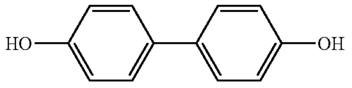

(DC-4)

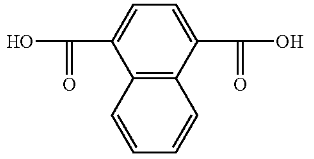

In production of the polyarylate resin (PA), the percentage content (3) can be adjusted by changing the amount (unit: mol) of the compound (BP-3) added relative to the total amount (unit: mol) of the compounds (BP-1) and (BP-3) added. Also, the percentage content (4) can be adjusted by changing the amount (unit: mol) of the compound (DC-4) added relative to the total amount (unit: mol) of the compounds (DC-2) and (DC-4) added.

The bisphenol may be derivatized in an aromatic diacetate for use. The dicarboxylic acid may be derivatized for use. Examples of a derivative of the dicarboxylic acid include dicarboxylic acid dichloride, dicarboxylic acid dimethyl ester, dicarboxylic acid diethyl ester, and dicarboxylic acid anhydride. Dicarboxylic acid dichloride is a compound in which two "—C(=O)—OH" groups of dicarboxylic acid have each been replaced by a "—C(=O)—Cl" group.

In condensation polymerization of the bisphenol and the dicarboxylic acid, a terminator may be added. Examples of the terminator include 2,6-dimethylphenol and 1H,1H-perfluoro-1-heptanol. As a result of 2,6-dimethylphenol being used as the terminator, the end group (T-DMP) can be formed. As a result of 1H,1H-perfluoro-1-heptanol being used as the terminator, the end group (T-PFH) can be formed.

In condensation polymerization of the bisphenol and the dicarboxylic acid, either or both a base and a catalyst may be added. An example of the base is sodium hydroxide. Examples of the catalyst include benzyltributylammonium chloride, ammonium chloride, ammonium bromide, quaternary ammonium salt, triethylamine, and trimethylamine.

Second Embodiment: Photosensitive Member

A second embodiment of the present invention relates to a photosensitive member. The photosensitive member of the second embodiment includes a conductive substrate and a photosensitive layer. The photosensitive layer contains a charge generating material, a hole transport material, and a binder resin. The photosensitive member is a single-layer electrophotographic photosensitive member (also referred to below as single-layer photosensitive member) or a multi-layer electrophotographic photosensitive member (also referred to below as multi-layer photosensitive member), for example.

(Multi-Layer Photosensitive Member)

Figure 2:
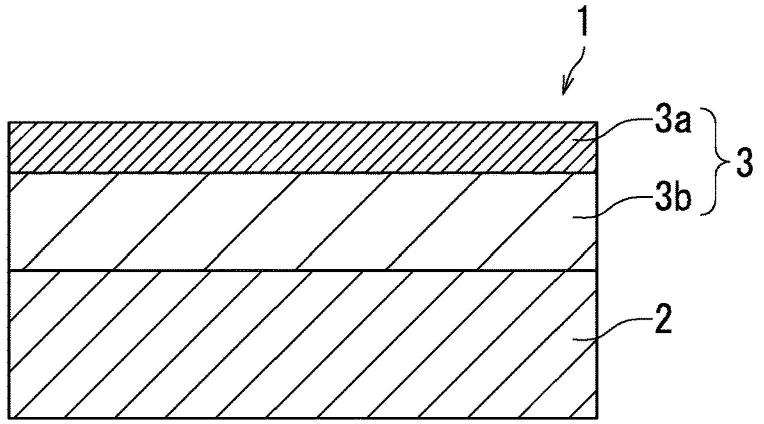
FIG. 2 is a partial cross-sectional view of a multi-layer electrophotographic photosensitive member that is an example of the electrophotographic photosensitive member according to the second embodiment of the present invention.
Figure 3:
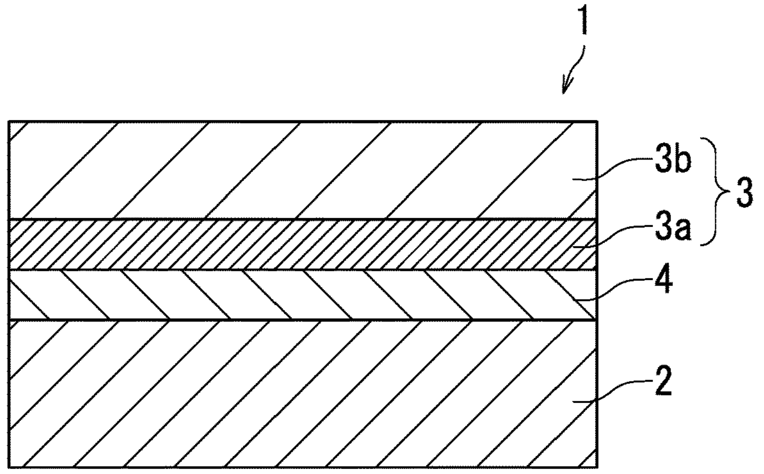
FIG. 3 is a partial cross-sectional view of a multi-layer electrophotographic photosensitive member that is an example of the electrophotographic photosensitive member according to the second embodiment of the present invention.

The following describes a multi-layer photosensitive member 1 that is an example of the photosensitive member with reference to FIGS. 1 to 3. FIGS. 1 to 3 each are a partial cross-sectional view of the multi-layer photosensitive member 1.

As illustrated in FIG. 1, the multi-layer photosensitive member 1 includes a conductive substrate 2 and a photosensitive layer 3, for example. The photosensitive layer 3 includes a charge generating layer 3*a* and a charge transport layer 3*b*. That is, the multi-layer photosensitive member 1 includes a charge generating layer 3*a* and a charge transport layer 3*b* as the photosensitive layer 3. The charge generating layer 3*a* is a single layer, for example. The charge transport layer 3*b* is a single layer, for example.

As illustrated in FIG. 1, it is possible that the charge generating layer 3*a* is disposed on the conductive substrate 2 and the charge transport layer 3*b* is disposed on the charge generating layer 3*a*. Alternatively, as illustrated in FIG. 2, it is possible that the charge transport layer 3*b* is disposed on the conductive substrate 2 and the charge generating layer 3*a* is disposed on the charge transport layer 3*b*.

As illustrated in FIG. 3, the multi-layer photosensitive member 1 may further include an intermediate layer 4 (undercoat layer) in addition to the conductive substrate 2 and the photosensitive layer 3. The intermediate layer 4 is disposed between the conductive substrate 2 and the photosensitive layer 3. As illustrated in FIGS. 1 and 2, the photosensitive layer 3 may be disposed directly on the conductive substrate 2 in the multi-layer photosensitive member 1. Alternatively, as illustrated in FIG. 3, the photosensitive layer 3 may be disposed on the conductive substrate 2 with the intermediate layer 4 therebetween in the multi-layer photosensitive member 1. In a case in which the multi-layer photosensitive member 1 includes the intermediate layer 4, it is possible that the intermediate layer 4 is disposed on the conductive substrate 2, the charge generating layer 3*a* is disposed on the intermediate layer 4, and the charge transport layer 3*b* is disposed on the charge generating layer 3*a* as illustrated in FIG. 3. Alternatively, it is possible that the intermediate layer 4 is disposed on the conductive substrate 2, the charge transport layer 3*b* is disposed on the intermediate layer 4, and the charge generating layer 3*a* is disposed on the charge transport layer 3*b*.

The multi-layer photosensitive member 1 may further include a protective layer 5 (see FIG. 6) in addition to the conductive substrate 2 and the photosensitive layer 3. The protective layer 5 is disposed on the photosensitive layer 3. As illustrated in FIGS. 1 to 3, the photosensitive layer 3 (e.g., the charge transport layer 3*b* or the charge generating layer 3*a*) may be provided as an outermost layer of the multi-layer photosensitive member 1. Alternatively, the protective layer 5 may be provided as an outermost layer of the multi-layer photosensitive member 1.

As illustrated in FIG. 1, the photosensitive layer 3 (preferably, the charge transport layer 3*b*) is preferably provided as an outermost layer of the multi-layer photosensitive member 1. It is further preferable that the charge transport layer 3*b* is a single layer serving as an outermost layer of the multi-layer photosensitive member 1. As a result of provision of the charge transport layer 3*b* containing the polyarylate resin (PA) as an outermost layer, abrasion resistance of the multi-layer photosensitive member 1 can be further increased.

The charge generating layer 3*a* contains a charge generating material. The charge generating layer 3*a* may contain a base resin as necessary. The charge generating layer 3*a* may contain an additive as necessary. Although no particular limitations are placed on the thickness of the charge generating layer 3*a*, the charge generating layer 3*a* has a thickness of preferably at least 0.01 μm and no greater than 5 μm, and more preferably at least 0.1 μm and no greater than 3 μm.

The charge transport layer 3*b* contains a hole transport material and a binder resin. The charge transport layer 3*b* may contain an additive as necessary. Although no particular limitations are placed on the thickness of the charge transport layer 3*b*, the charge transport layer 3*b* has a thickness of preferably at least 2 μm and no greater than 100 μm, and more preferably at least 5 μm and no greater than 50 μm. The multi-layer photosensitive member 1 has been described so far with reference to FIGS. 1 to 3.

(Single-Layer Photosensitive Member)

Figure 4:
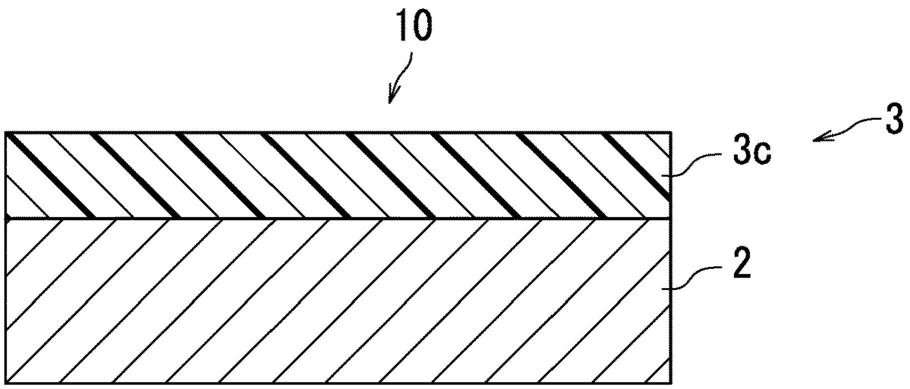
FIG. 4 is a partial cross-sectional view of a single-layer electrophotographic photosensitive member that is an example of the electrophotographic photosensitive member according to the second embodiment of the present invention.
Figure 5:
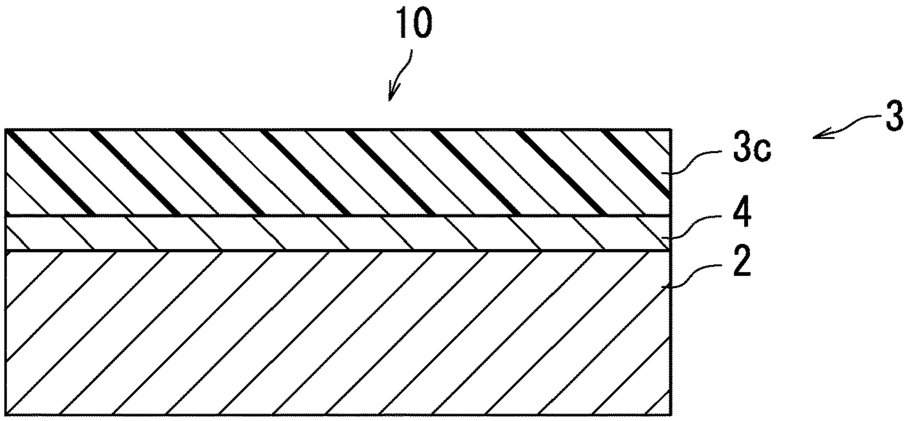
FIG. 5 is a partial cross-sectional view of a single-layer electrophotographic photosensitive member that is an example of the electrophotographic photosensitive member according to the second embodiment of the present invention.
Figure 6:
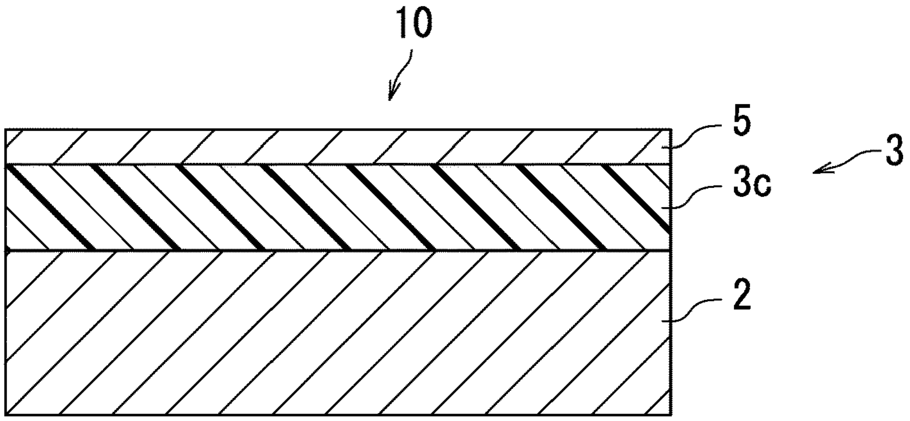
FIG. 6 is a partial cross-sectional view of a single-layer electrophotographic photosensitive member that is an example of the electrophotographic photosensitive member according to the second embodiment of the present invention.

The following describes a single-layer photosensitive member 10 that is an example of the photosensitive member with reference to FIGS. 4 to 6. FIGS. 4 to 6 each are a partial cross-sectional view of the single-layer photosensitive member 10.

As illustrated in FIG. 4, the single-layer photosensitive member 10 includes a conductive substrate 2 and a photosensitive layer 3, for example. The photosensitive layer 3 of the single-layer photosensitive member 10 is a single layer. In the following, the "photosensitive layer 3 of a single layer" may be also referred to below as "single-layer photosensitive layer 3*c*".

As illustrated in FIG. 5, the single-layer photosensitive member 10 may further include an intermediate layer 4 (undercoat layer) in addition to the conductive substrate 2 and the single-layer photosensitive layer 3*c*. The intermediate layer 4 is disposed between the conductive substrate 2 and the single-layer photosensitive layer 3*c*. The single-layer photosensitive layer 3*c* may be disposed directly on the conductive substrate 2 as illustrated in FIG. 4. Alternatively, the single-layer photosensitive layer 3*c* may be disposed on the conductive substrate 2 with the intermediate layer 4 therebetween as illustrated in FIG. 5.

As illustrated in FIG. 6, the single-layer photosensitive member 10 may further include a protective layer 5 in addition to the conductive substrate 2 and the single-layer photosensitive layer 3*c*. The protective layer 5 is disposed on the single-layer photosensitive layer 3*c*. As illustrated in FIGS. 4 and 5, the single-layer photosensitive layer 3*c* may be provided as an outermost layer of the single-layer photosensitive member 10. Alternatively, the protective layer 5 may be provided as an outermost layer of the single-layer photosensitive member 10 as illustrated in FIG. 6.

As illustrated in FIGS. 4 and 5, the photosensitive layer 3 (specifically, the single-layer photosensitive layer 3*c*) is preferably provided as an outermost layer of the single-layer photosensitive member 10. As a result of provision of the single-layer photosensitive layer 3*c* containing the polyarylate resin (PA) as an outermost layer, the single-layer photosensitive member 10 can have further increased abrasion resistance.

The single-layer photosensitive layer 3*c* contains a charge generating material, a hole transport material, and a binder resin. The single-layer photosensitive layer 3*c* may further contain an electron transport material as necessary. The single-layer photosensitive layer 3*c* may contain an additive as necessary.

Although no particular limitations are placed on the thickness of the single-layer photosensitive layer 3*c*, the single-layer photosensitive layer 3*c* has a thickness of preferably at least 5 μm and no greater than 100 μm, and more preferably at least 10 μm and no greater than 50 μm. The single-layer photosensitive member 10 has been described so far reference to FIGS. 4 to 6.

(Binder Resin)

The binder resin includes the polyarylate resin (PA) described in the first embodiment. The photosensitive layer of the photosensitive member can be favorably formed through use of the polyarylate resin (PA) excellent in solubility in a solvent. Furthermore, as a result of the photosensitive layer containing the polyarylate resin (PA), the photosensitive member can have increased repetitive sensitivity and abrasion resistance.

The photosensitive layer may contain only one polyarylate resin (PA) or contain two or more polyarylate resins (PA) as the binder resin. Furthermore, the photosensitive layer may contain only the polyarylate resin (PA) as the binder resin or may further contain a binder resin (also referred to below as an additional binder resin) other than the polyarylate resin (PA). Examples of the additional binder resin include thermoplastic resins (specific examples include polyarylate resins other than the polyarylate resin (PA), polycarbonate resins, styrene-based resins, styrene-butadiene copolymers, styrene-acrylonitrile copolymers, styrene-maleic acid copolymers, styrene-acrylic acid copolymers, acryl copolymers, polyethylene resins, ethylene-vinyl acetate copolymers, chlorinated polyethylene resins, polyvinyl chloride resins, polypropylene resins, ionomers, vinyl chloride-vinyl acetate copolymers, polyester resins, alkyd resins, polyamide resins, polyurethane resins, polysulfone resins, diallyl phthalate resins, ketone resins, polyvinyl butyral resins, polyvinyl acetal resins, and polyether resins), thermosetting resins (specific examples include silicone resins, epoxy resins, phenolic resins, urea resins, melamine resins, and crosslinkable thermosetting resins other than these), and photocurable resins (specific example include epoxy-acrylic acid-based resins and urethane-acrylic acid-based copolymers).

(Hole Transport Material)

Examples of the hole transport material include triphenylamine derivatives, diamine derivatives (e.g., an N,N,N',N'-tetraphenylbenzidine derivative, an N,N,N',N'-tetraphenylphenylenediamine derivative, an N,N,N',N'-tetraphenylnaphtylenediamine derivative, an N,N,N',N'-tetraphenylphenanthrylenediamine derivative, and a di(aminophenylethenyl)benzene derivative), oxadiazole-based compounds (e.g., 2,5-di(4-methylaminophenyl)-1,3,4-oxadiazole), styryl-based compounds (e.g., 9-(4-diethylaminostyryl)anthracene), carbazole-based compounds (e.g., polyvinyl carbazole), organic polysilane compounds, pyrazoline-based compounds (e.g., 1-phenyl-3-(p-dimethylaminophenyl)pyrazoline), hydrazone-based compounds, indole-based compounds, oxazole-based compounds, isoxazole-based compounds, thiazole-based compounds, thiadiazole-based compounds, imidazole-based compounds, pyrazole-based compounds, and triazole-based compounds. The photosensitive layer may contain one hole transport material or contain two or more hole transport materials.

Preferable examples of the hole transport material include compounds represented by formulas (20), (21), and (22) (also referred to below as hole transport materials (20), (21), and (22), respectively). As a result of the photosensitive layer containing the hole transport material (20), (21), or (22) together with the polyarylate resin (PA), the photosensitive layer can be further favorably formed and the photosensitive member can have further increased repetitive sensitivity and abrasion resistance.

[Chemical Formula 12]

(20)

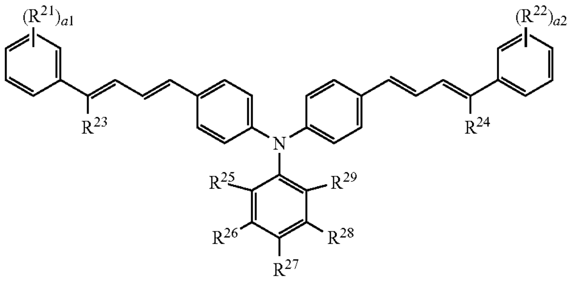

(21)

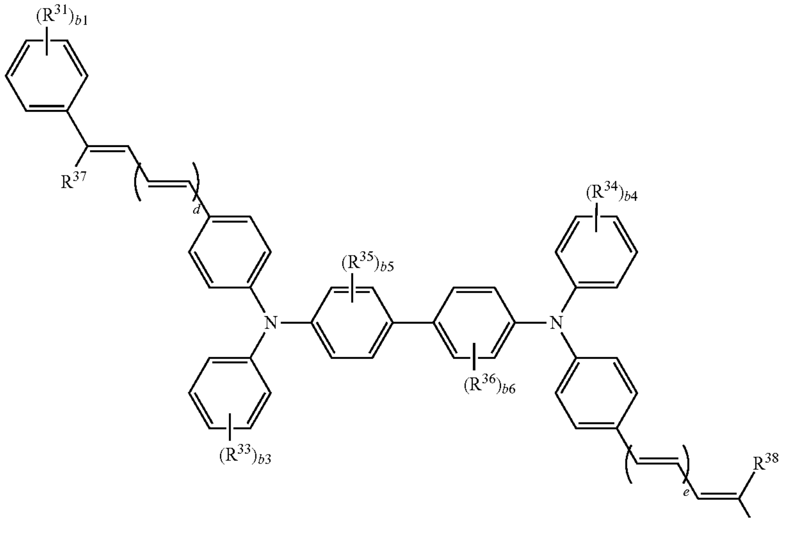

-continued

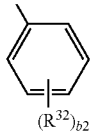

(22)

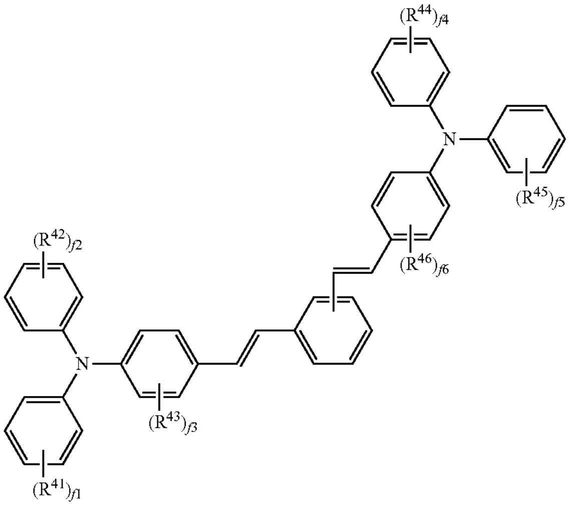

In formula (20), $R^{21}$ and $R^{22}$ each represent, independently of one another, a phenyl group, an alkyl group with a carbon number of at least 1 and no greater than 8, or an alkoxy group with a carbon number of at least 1 and no greater than 8. $R^{23}$, $R^{24}$, $R^{25}$, $R^{26}$, $R^{27}$, $R^{28}$, and $R^{29}$ each represent, independently of one another, a hydrogen atom, an alkyl group with a carbon number of at least 1 and no greater than 8, a phenyl group optionally substituted with an alkyl group with a carbon number of at least 1 and no greater than 8, or an alkoxy group with a carbon number of at least 1 and no greater than 8. Any adjacent two chemical groups among $R^{25}$, $R^{26}$, $R^{27}$, $R^{28}$, and $R^{29}$ may be bonded to form a ring. a1 and a2 each represent, independently of one another, an integer of at least 0 and no greater than 5.

In formula (20), where a1 represents an integer of at least 2 and no greater than 5, the chemical groups $R^{21}$ may represent the same group as each other or represent groups different from each other. Where a2 represents an integer of at least 2 and no greater than 5, the chemical groups $R^{22}$ may represent the same group as each other or represent groups different from each other.

In formula (20), $R^{21}$ and $R^{22}$ each represent, independently of one another, preferably an alkyl group with a carbon number of at least 1 and no greater than 8, more preferably an alkyl group with a carbon number of at least 1 and no greater than 3, and further preferably a methyl group.

In formula (20), preferably, $R^{23}$ and $R^{24}$ each represent, independently of one another, a hydrogen atom or a phenyl group optionally substituted with an alkyl group with a carbon number of at least 1 and no greater than 8. The phenyl group optionally substituted with an alkyl group with a carbon number of at least 1 and no greater than 8 that is represented by $R^{23}$ or $R^{24}$ is preferably a phenyl group substituted with an alkyl group with a carbon number of at least 1 and no greater than 8, more preferably a phenyl group substituted with an alkyl group with a carbon number of at least 1 and no greater than 3, further preferably a methylphenyl group, and particularly preferably a 4-methylphenyl group.

In formula (20), preferably, $R^{25}$ to $R^{29}$ each represent, independently of one another, a hydrogen atom or an alkoxy group with a carbon number of at least 1 and no greater than 8. The alkoxy group with a carbon number of at least 1 and no greater than 8 represented by any of $R^{25}$ to $R^{29}$ is preferably an alkoxy group with a carbon number of at least 1 and no greater than 3, and more preferably a methoxy group or an ethoxy group. Where any adjacent two chemical groups among $R^{25}$ to $R^{29}$ are bonded to form a ring, the ring and a phenyl group to which $R^{25}$ to $R^{29}$ are bonded are fused to form a fused bi-cyclic group. In this case, the fused portion of the ring and the phenyl group may have a double bond. Where any adjacent two chemical groups among $R^{25}$ to $R^{29}$ are bonded to form a ring, the ring is preferably a cycloalkane with a carbon number of at least 5 and no greater than 7, and more preferably cyclohexane.

In formula (20), preferably, a1 and a2 each represent, independently of one another, 0 or 1.

In formula (21), $R^{31}$, $R^{32}$, $R^{33}$, $R^{34}$, $R^{35}$, and $R^{36}$ each represent, independently of one another, a phenyl group or an alkyl group with a carbon number of at least 1 and no greater than 8. $R^{37}$ and $R^{38}$ each represent, independently of one another, a hydrogen atom, a phenyl group, or an alkyl group with a carbon number of at least 1 and no greater than 8. b1, b2, b3, and b4 each represent, independently of one another, an integer of at least 0 and no greater than 5. b5 and b6 each represent, independently of one another, an integer of at least 0 and no greater than 4. d and e each represent, independently of one another, 0 or 1.

In formula (21), where b1 represents an integer of at least 2 and no greater than 5, the chemical groups $R^{31}$ may represent the same group as each other or represent groups different from each other. Where b2 represents an integer of at least 2 and no greater than 5, the chemical groups $R^{32}$ may represent the same group as each other or represent groups different from each other. Where b3 represents an integer of at least 2 and no greater than 5, the chemical groups $R^{33}$ may represent the same group as each other or represent groups different from each other. Where b4 represents an integer of at least 2 and no greater than 5, the chemical groups $R^{34}$ may represent the same group as each other or represent groups different from each other. Where b5 represents an integer of at least 2 and no greater than 4, the chemical groups $R^{35}$ may represent the same group as each other or represent groups different from each other. Where b6 represents an integer of at least 2 and no greater than 4, the chemical groups $R^{36}$ may represent the same group as each other or represent groups different from each other.

In formula (21), $R^{31}$ to $R^{36}$ each represent, independently of one another, preferably an alkyl group with a carbon number of at least 1 and no greater than 8, more preferably an alkyl group with a carbon number of at least 1 and no greater than 3, and further preferably a methyl group or an ethyl group. Each of $R^{37}$ and $R^{38}$ preferably represents a hydrogen atom. Preferably, b1, b2, b3, and b4 each represent, independently of one another, an integer of at least 0 and no greater than 2. Preferably, b5 and b6 each represent 0.

In formula (22), $R^{41}$, $R^{42}$, $R^{43}$, $R^{44}$, $R^{45}$, and $R^{46}$ each represent, independently of one another, a phenyl group, an alkyl group with a carbon number of at least 1 and no greater than 8, or an alkoxy group with a carbon number of at least 1 and no greater than 8. f1, f2, f4, and f5 each represent, independently of one another, an integer of at least 0 and no greater than 5. f3 and f6 each represent, independently of one another, an integer of at least 0 and no greater than 4.

In formula (22), where f1 represents an integer of at least 2 and no greater than 5, the chemical groups $R^{41}$ may represent the same group as each other or represent groups different from each other. Where f2 represents an integer of at least 2 and no greater than 5, the chemical groups $R^{42}$ may represent the same group as each other or represent groups different from each other. Where f4 represents an integer of at least 2 and no greater than 5, the chemical groups $R^{44}$ may represent the same group as each other or represent groups different from each other. Where f5 represents an integer of at least 2 and no greater than 5, the chemical groups $R^{45}$ may represent the same group as each other or represent groups different from each other. Where f3 represents an integer of at least 2 and no greater than 4, the chemical groups $R^{43}$ may represent the same group as each other or represent groups different from each other. Where f6 represents an integer of at least 2 and no greater than 4, the chemical groups $R^{46}$ may represent the same group as each other or represent groups different from each other.

In formula (22), $R^{41}$ to $R^{46}$ each represent, independently of one another, preferably an alkyl group with a carbon number of at least 1 and no greater than 8, more preferably an alkyl group with a carbon number of at least 1 and no greater than 3, and further preferably a methyl group or an ethyl group. Preferably, f1, f2, f4, and f5 each represent, independently of one another, an integer of at least 0 and no greater than 2. Preferably, f3 and f6 each represent 0. A diphenylaminophenylethenyl group with $R^{44}$, $R^{45}$, and $R^{46}$ is preferably bonded at a para position of the phenyl group to a diphenylaminophenylethenyl group with $R^{41}$, $R^{42}$, and $R^{43}$.

More preferable examples of the hole transport material include compounds represented by formulas (HTM-1) to (HTM-6) (also referred to below as hole transport materials (HTM-1) to (HTM-6), respectively).

[Chemical Formula 13]

(HTM-1)

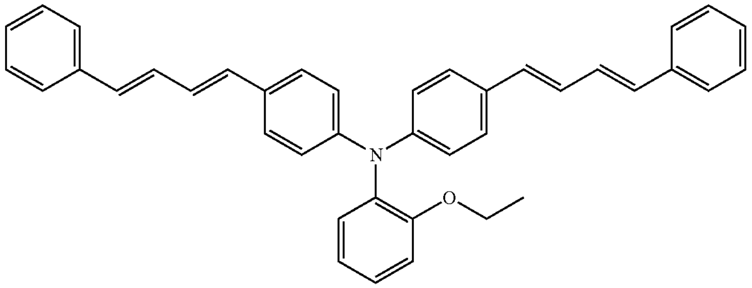

(HTM-2)

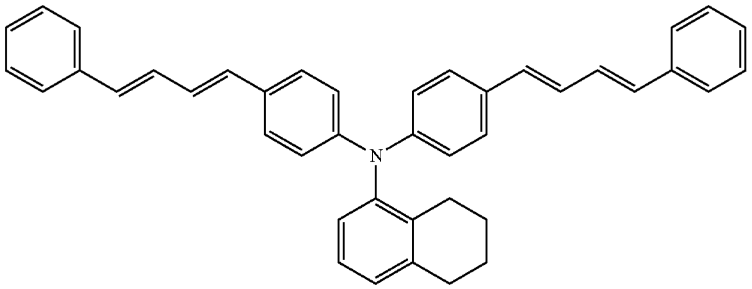

-continued
(HTM-3)
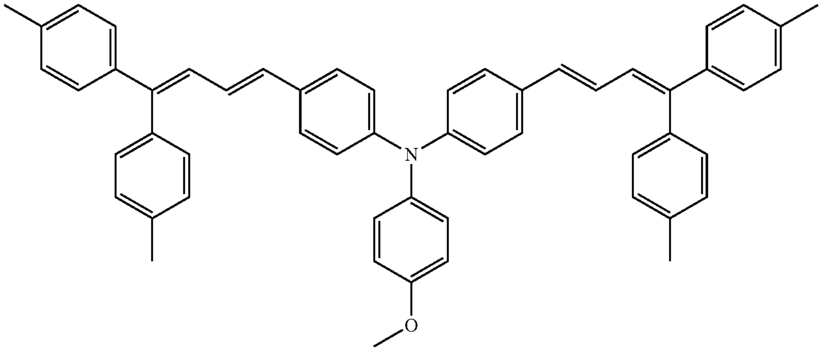
[Chemical Formula 14]
(HTM-4)
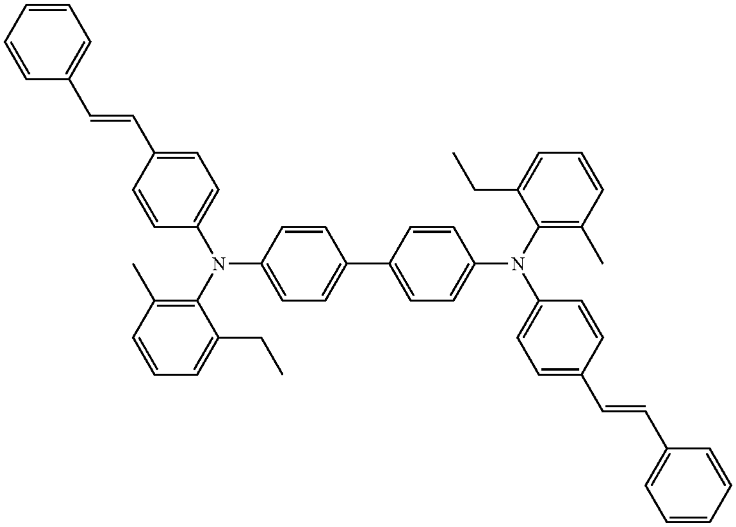
(HTM-5)
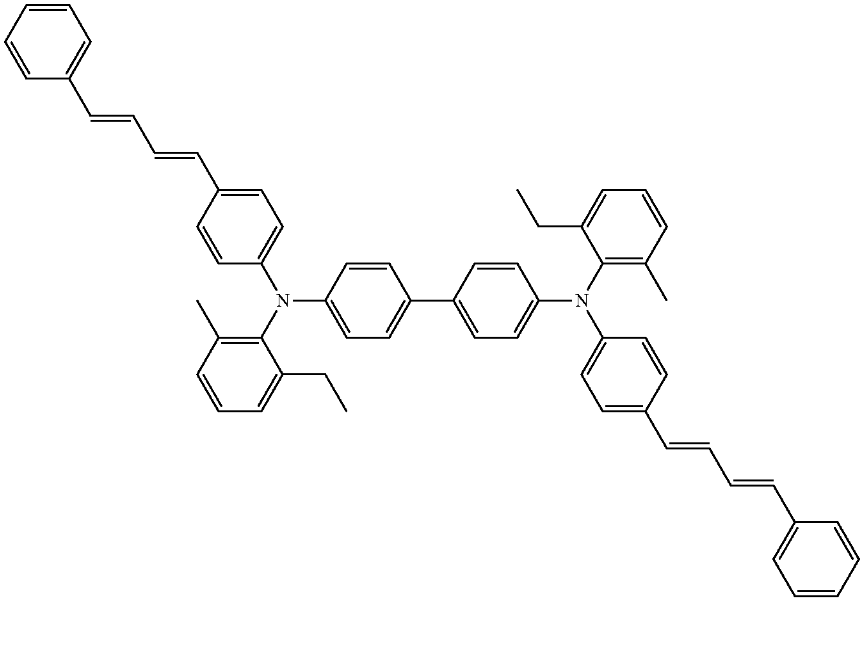

-continued (HTM-6)

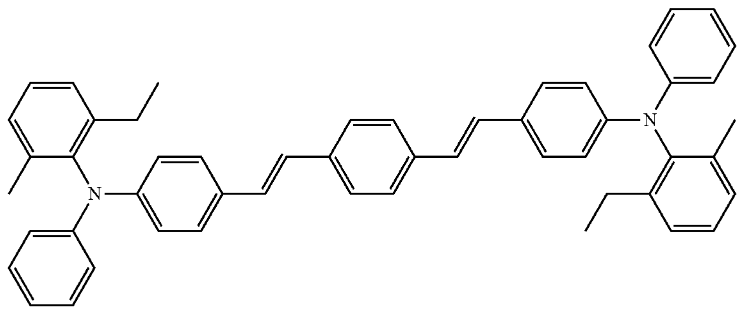

In a case of the photosensitive member being a multi-layer photosensitive member, the amount of the hole transport material is preferably at least 10 parts by mass and no greater than 200 parts by mass relative to 100 parts by mass of the binder resin, more preferably at least 20 parts by mass and no greater than 100 parts by mass, and further preferably at least 40 parts by mass and no greater than 60 parts by mass. In a case of the photosensitive member being a single-layer photosensitive member, the amount of the hole transport material is preferably at least 50 parts by mass and no greater than 200 parts by mass relative to 100 parts by mass of the binder resin, and more preferably at least 50 parts by mass and no greater than 70 parts by mass.

(Charge Generating Material)

Examples of the charge generating material include a phthalocyanine-based pigment, a perylene-based pigment, a bisazo pigment, a tris-azo pigment, a dithioketopyrrolopyrrole pigment, a metal-free naphthalocyanine pigment, a metal naphthalocyanine pigment, a squaraine pigment, an indigo pigment, an azulenium pigment, a cyanine pigment, powders of inorganic photoconductive materials (e.g., selenium, selenium-tellurium, selenium-arsenic, cadmium sulfide, and amorphous silicon), a pyrylium pigment, an anthanthrone-based pigment, a triphenylmethane-based pigment, a threne-based pigment, a toluidine-based pigment, a pyrazoline-based pigment, and a quinacridone-based pigment. The photosensitive layer may contain only one charge generating material or may contain two or more charge generating materials.

The phthalocyanine-based pigment is a pigment with phthalocyanine structure. Examples of the phthalocyanine-based pigment include metal-free phthalocyanine and metal phthalocyanines. Examples of the metal phthalocyanines include titanyl phthalocyanine, hydroxygallium phthalocyanine, and chlorogallium phthalocyanine. Metal-free phthalocyanine is represented by formula (CGM-1). Titanyl phthalocyanine is represented by formula (CGM-2).

[Chemical Formula 15]

(CGM-1)

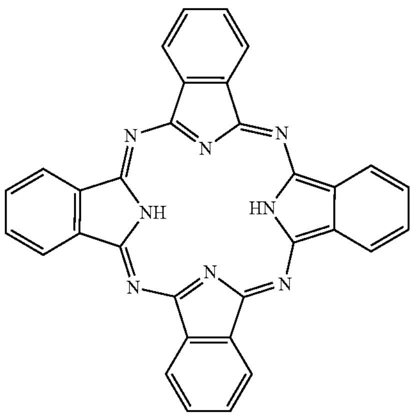

[Chemical Formula 16]

(CGM-2)

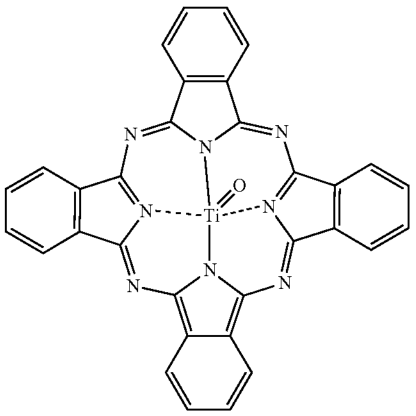

The phthalocyanine-based pigment may be crystalline or non-crystalline. Examples of crystalline metal-free phthalocyanine include metal-free phthalocyanine with X-form crystal structure (also referred to below as X-form metal-free phthalocyanine). Examples of crystalline titanyl phthalocyanine include titanyl phthalocyanine with any of α-form crystal structure, β-form crystal structure, and Y-form crystal structure (also referred to below as α-from titanyl phthalocyanine, β-form titanyl phthalocyanine, and Y-form titanyl phthalocyanine, respectively).

For example, in a digital optical image forming apparatus (e.g., a laser beam printer or facsimile machine that uses a light source such as a semiconductor laser), a photosensitive member that is sensitive to light in a wavelength range of at least 700 nm is preferably used. In terms of high quantum yield in a wavelength range of at least 700 nm, the charge generating material is preferably a phthalocyanine-based pigment, more preferably metal-free phthalocyanine or titanyl phthalocyanine, further preferably titanyl phthalocyanine, and particularly preferably Y-form titanyl phthalocyanine.

Y-form titanyl phthalocyanine exhibits a main peak for example at a Bragg angle (2θ±0.2°) of 27.2° in a CuKα characteristic X-ray diffraction spectrum. The term main peak in the CuKα characteristic X-ray diffraction spectrum refers to a most intense or second most intense peak within a range of Bragg angles (2θ±0.2°) from 3° to 40°. Y-form titanyl phthalocyanine has no peaks at 26.2° C. in the CuKα characteristic X-ray diffraction spectrum.

The CuKα characteristic X-ray diffraction spectrum can be measured by the following methods, for example. A sample (titanyl phthalocyanine) is loaded into a sample holder of an X-ray diffraction spectrometer (e.g., "RINT (registered Japanese trademark) 1100", product of Rigaku Corporation) and an X-ray diffraction spectrum is plotted using a Cu X-ray tube under conditions of a tube voltage of 40 kV, a tube current of 30 mA, and CuKα characteristic X-rays with a wavelength of 1.542 Å. The measurement range (2θ) is for example from 3° to 40° (start angle: 3°, stop angle: 40°), and the scanning speed is for example 10°/min A main peak in the plotted X-ray diffraction spectrum is determined, and a Bragg angle of the main peak is read.

In a case of the photosensitive member being a multilayer photosensitive member, the amount of the charge generating material is preferably at least 10 parts by mass and no greater than 300 parts by mass relative to 100 parts by mass of the base resin, and more preferably at least 100 parts by mass and no greater than 200 parts by mass. In a case of the photosensitive member being a single-layer photosensitive member, the amount of the charge generating material is preferably at least 0.1 parts by mass and no greater than 50 parts by mass relative to 100 parts by mass of the binder resin, and more preferably at least 0.5 parts by mass and no greater than 30 parts by mass.

(Base Resin)

Examples of the base resin contained in the charge generating layer are the same as those listed as the examples of the additional binder resin contained in the charge transport layer.

(Additive)

Examples of the additive include an ultraviolet absorbing agent, an antioxidant, a radical scavenger, a singlet quencher, a softener, a surface modifier, an extender, a thickener, a dispersion stabilizer, a wax, a donor, a surfactant, a plasticizer, a sensitizer, an electron acceptor compound, and a leveling agent. The leveling agent is preferably a silicone oil, and more preferably a silicone oil with dimethylpolysiloxane structure.

(Material Combination)

In order to favorably form the photosensitive layer and increase repetitive sensitivity and abrasion resistance of the photosensitive member, a combination of the hole transport material and the binder resin is preferably any of combination Nos. a-1 to a-24 and b-1 to b-48 shown in Table 3 and combination Nos. c-1 to c-60 shown in Table 4. For the same purpose as above, it is preferable that the combination of the hole transport material and the binder resin is any of combination Nos. a-1 to a-24 and b-1 to b-48 shown in Table 3 and combination Nos. c-1 to c-60 shown in Table 4 and the charge generating material is Y-form titanyl phthalocyanine. For the same purpose as above, it is more preferable that the combination of the hole transport material and the binder resin is any of combination Nos. a-1 to a-24 and b-1 to b-48 shown in Table 3 and combination Nos. c-1 to c-60 shown in Table 4 and the additive added to the charge transport layer is meta-terphenyl. For the same purpose as above, it is further preferable that the combination of the hole transport material and the binder resin is any of combination Nos. a-1 to a-24 and b-1 to b-48 shown in Table 3 and combination Nos. c-1 to c-60 shown in Table 4 and the additive added to the charge transport layer is a silicon oil (more specifically, silicone oil with dimethylpolysiloxane structure). In Tables 3 and 4, "No." indicates the "Combination No.", "HTM" indicates "hole transport material", and "Resin" indicates a "polyarylate resin" being the binder resin. Polyarylate resins A to I and P in Table 4 will be described in detail in Examples.

TABLE 3

| No. | HTM | Resin |
|---|---|---|
| a-1 | HTM-1 | PA-1 |
| a-2 | HTM-2 | PA-1 |
| a-3 | HTM-3 | PA-1 |
| a-4 | HTM-4 | PA-1 |
| a-5 | HTM-5 | PA-1 |
| a-6 | HTM-6 | PA-1 |
| a-7 | HTM-1 | PA-2 |
| a-8 | HTM-2 | PA-2 |
| a-9 | HTM-3 | PA-2 |
| a-10 | HTM-4 | PA-2 |
| a-11 | HTM-5 | PA-2 |
| a-12 | HTM-6 | PA-2 |
| a-13 | HTM-1 | PA-3 |
| a-14 | HTM-2 | PA-3 |
| a-15 | HTM-3 | PA-3 |
| a-16 | HTM-4 | PA-3 |
| a-17 | HTM-5 | PA-3 |
| a-18 | HTM-6 | PA-3 |
| a-19 | HTM-1 | PA-4 |
| a-20 | HTM-2 | PA-4 |
| a-21 | HTM-3 | PA-4 |
| a-22 | HTM-4 | PA-4 |
| a-23 | HTM-5 | PA-4 |
| a-24 | HTM-6 | PA-4 |
| b-1 | HTM-1 | PA-a |
| b-2 | HTM-2 | PA-a |
| b-3 | HTM-3 | PA-a |
| b-4 | HTM-4 | PA-a |
| b-5 | HTM-5 | PA-a |
| b-6 | HTM-6 | PA-a |
| b-7 | HTM-1 | PA-b |
| b-8 | HTM-2 | PA-b |
| b-9 | HTM-3 | PA-b |
| b-10 | HTM-4 | PA-b |
| b-11 | HTM-5 | PA-b |
| b-12 | HTM-6 | PA-b |
| b-13 | HTM-1 | PA-c |
| b-14 | HTM-2 | PA-c |
| b-15 | HTM-3 | PA-c |
| b-16 | HTM-4 | PA-c |
| b-17 | HTM-5 | PA-c |
| b-18 | HTM-6 | PA-c |
| b-19 | HTM-1 | PA-d |
| b-20 | HTM-2 | PA-d |
| b-21 | HTM-3 | PA-d |
| b-22 | HTM-4 | PA-d |
| b-23 | HTM-5 | PA-d |
| b-24 | HTM-6 | PA-d |
| b-25 | HTM-1 | PA-e |

TABLE 3-continued

| No. | HTM | Resin |
|---|---|---|
| b-26 | HTM-2 | PA-e |
| b-27 | HTM-3 | PA-e |
| b-28 | HTM-4 | PA-e |
| b-29 | HTM-5 | PA-e |
| b-30 | HTM-6 | PA-e |
| b-31 | HTM-1 | PA-f |
| b-32 | HTM-2 | PA-f |
| b-33 | HTM-3 | PA-f |
| b-34 | HTM-4 | PA-f |
| b-35 | HTM-5 | PA-f |
| b-36 | HTM-6 | PA-f |
| b-37 | HTM-1 | PA-g |
| b-38 | HTM-2 | PA-g |
| b-39 | HTM-3 | PA-g |
| b-40 | HTM-4 | PA-g |
| b-41 | HTM-5 | PA-g |
| b-42 | HTM-6 | PA-g |
| b-43 | HTM-1 | PA-h |
| b-44 | HTM-2 | PA-h |
| b-45 | HTM-3 | PA-h |
| b-46 | HTM-4 | PA-h |
| b-47 | HTM-5 | PA-h |
| b-48 | HTM-6 | PA-h |

TABLE 4

| No. | HTM | Resin |
|---|---|---|
| c-1 | HTM-1 | A |
| c-2 | HTM-2 | A |
| c-3 | HTM-3 | A |
| c-4 | HTM-4 | A |
| c-5 | HTM-5 | A |
| c-6 | HTM-6 | A |
| c-7 | HTM-1 | B |
| c-8 | HTM-2 | B |
| c-9 | HTM-3 | B |
| c-10 | HTM-4 | B |
| c-11 | HTM-5 | B |
| c-12 | HTM-6 | B |
| c-13 | HTM-1 | C |
| c-14 | HTM-2 | C |
| c-15 | HTM-3 | C |
| c-16 | HTM-4 | C |
| c-17 | HTM-5 | C |
| c-18 | HTM-6 | C |
| c-19 | HTM-1 | D |
| c-20 | HTM-2 | D |
| c-21 | HTM-3 | D |
| c-22 | HTM-4 | D |
| c-23 | HTM-5 | D |
| c-24 | HTM-6 | D |
| c-25 | HTM-1 | E |
| c-26 | HTM-2 | E |
| c-27 | HTM-3 | E |
| c-28 | HTM-4 | E |
| c-29 | HTM-5 | E |
| c-30 | HTM-6 | E |
| c-31 | HTM-1 | F |
| c-32 | HTM-2 | F |
| c-33 | HTM-3 | F |
| c-34 | HTM-4 | F |
| c-35 | HTM-5 | F |
| c-36 | HTM-6 | F |
| c-37 | HTM-1 | G |
| c-38 | HTM-2 | G |
| c-39 | HTM-3 | G |
| c-40 | HTM-4 | G |
| c-41 | HTM-5 | G |
| c-42 | HTM-6 | G |
| c-43 | HTM-1 | H |
| c-44 | HTM-2 | H |
| c-45 | HTM-3 | H |
| c-46 | HTM-4 | H |
| c-47 | HTM-5 | H |

TABLE 4-continued

| No. | HTM | Resin |
|---|---|---|
| c-48 | HTM-6 | H |
| c-49 | HTM-1 | I |
| c-50 | HTM-2 | I |
| c-51 | HTM-3 | I |
| c-52 | HTM-4 | I |
| c-53 | HTM-5 | I |
| c-54 | HTM-6 | I |
| c-55 | HTM-1 | P |
| c-56 | HTM-2 | P |
| c-57 | HTM-3 | P |
| c-58 | HTM-4 | P |
| c-59 | HTM-5 | P |
| c-60 | HTM-6 | P |

(Conductive Substrate)

No particular limitations are placed on the conductive substrate so long as at least a surface portion thereof is made from a conductive material. An example of the conductive substrate is a conductive substrate made from a conductive material. Another example of the conductive substrate is a conductive substrate covered with a conductive material. Examples of the conductive material include aluminum, iron, copper, tin, platinum, silver, vanadium, molybdenum, chromium, cadmium, titanium, nickel, palladium, indium, stainless steel, and brass. Among the conductive materials listed above, aluminum or an aluminum alloy is preferable in terms of favorable charge mobility from the photosensitive layer to the conductive substrate.

The conductive substrate may have any shape and the shape thereof can be selected as appropriate according to the configuration of an image forming apparatus in which the conductive substrate is to be used. The conductive substrate has a sheet shape or a drum shape, for example. The thickness of the conductive substrate is selected as appropriate according to the shape of the conductive substrate.

(Intermediate Layer)

The intermediate layer (undercoat layer) contains for example inorganic particles and a resin (intermediate layer resin) for intermediate layer use. Provision of the intermediate layer may facilitate flow of electric current generated when the photosensitive member is exposed to light and inhibit increasing resistance, while also maintaining insulation to a sufficient degree so as to inhibit leakage of electric current from occurring.

Examples of the inorganic particles include particles of metals (e.g., aluminum, iron, and copper), particles of metal oxides (e.g., titanium oxide, alumina, zirconium oxide, tin oxide, and zinc oxide), and particles of non-metal oxides (e.g., silica).

Examples of the intermediate layer resin are the same as those listed as the examples of the additional binder resin as described previously. In order to favorably form the intermediate layer and the photosensitive layer, the intermediate layer resin is preferably different from the binder resin contained in the photosensitive layer. The intermediate layer may contain an additive. Examples of the additive contained in the intermediate layer are the same as those listed as the examples of the additive contained in the photosensitive layer.

(Photosensitive Member Production Method)

An example of a multi-layer photosensitive member production method and an example of a single-layer photosensitive member production method will be described that each are a photosensitive member production method.

The multi-layer photosensitive member production method includes a charge generating layer formation process and a charge transport layer formation process, for example. In the charge generating layer formation process, an application liquid (also referred to below as application liquid for charge generating layer formation) for forming a charge generating layer is prepared first. The application liquid for charge generating layer formation is applied onto a conductive substrate. Next, at least a portion of a solvent contained in the applied application liquid for charge generating layer formation is removed to form a charge generating layer. The application liquid for charge generating layer formation contains a charge generating material, a base resin, and the solvent, for example. The application liquid for charge generating layer formation such as above is prepared by dissolving or dispersing the charge generating material and the base resin in the solvent. The application liquid for charge generating layer formation may further contain an additive as necessary.

In the charge transport layer formation process, an application liquid (also referred to below as application liquid for charge transport layer formation) for forming a charge transport layer is prepared first. The application liquid for charge transport layer formation is applied onto the charge generating layer. Next, at least a portion of a solvent contained in the applied application liquid for charge transport layer formation is removed to form a charge transport layer. The application liquid for charge transport layer formation contains a hole transport material, a binder resin, and the solvent. The application liquid for charge transport layer formation is prepared by dissolving or dispersing the hole transport material and the binder resin in the solvent. The application liquid for charge transport layer formation may further contain an additive as necessary.

The single-layer photosensitive member production method includes a single-layer photosensitive layer formation process, for example. In the single-layer photosensitive layer formation process, an application liquid (also referred to below as application liquid for single-layer photosensitive layer formation) for forming a single-layer photosensitive layer is prepared. The application liquid for single-layer photosensitive layer formation is applied onto a conductive substrate. Next, at least a portion of a solvent contained in the applied application liquid for single-layer photosensitive layer formation is removed to form a single-layer photosensitive layer. The application liquid for single-layer photosensitive layer formation contains a charge generating material, a hole transport material, a binder resin, and the solvent, for example. The application liquid for single-layer photosensitive layer formation is prepared by dissolving or dispersing the charge generating material, the hole transport material, and the binder resin in the solvent. The application liquid for single-layer photosensitive layer formation may further contain either or both an electron transport material and an additive as necessary.

No particular limitations are placed on the respective solvents contained in the application liquid for single-layer photosensitive layer formation, the application liquid for charge generating layer formation, and the application liquid for charge transport layer formation (each also referred to generally below as application liquid) so long as each component contained in the respective application liquids can be dissolved or dispersed therein. Examples of the solvents include alcohols (specific examples include methanol, ethanol, isopropanol, and butanol), aliphatic hydrocarbons (specific examples include n-hexane, octane, and cyclohexane), aromatic hydrocarbons (specific examples include benzene, toluene, and xylene), halogenated hydrocarbons (specific examples include dichloromethane, dichloroethane, carbon tetrachloride, and chlorobenzene), ethers (specific examples include dimethyl ether, diethyl ether, tetrahydrofuran, ethylene glycol dimethyl ether, and diethylene glycol dimethyl ether), ketones (specific examples include acetone, methyl ethyl ketone, and cyclohexanone), esters (specific examples include ethyl acetate and methyl acetate), dimethyl formaldehyde, dimethyl formamide, and dimethyl sulfoxide.

The solvent contained in the application liquid for charge transport layer formation preferably differs from the solvent contained in the application liquid for charge generating layer formation. This is because it is preferable that the charge generating layer does not dissolve in the solvent of the application liquid for charge transport layer formation in application of the application liquid for charge transport layer formation onto the charge generating layer.

Each of the application liquids is prepared by mixing the corresponding components to disperse the components in the corresponding solvent. Mixing or dispersion can for example be performed using a bead mill, a roll mill, a ball mill, an attritor, a paint shaker, or an ultrasonic disperser.

No particular limitations are placed on a method for applying the application liquid so long as uniform application of the application liquid can be achieved. Examples of the method for applying the application liquid include dip coating, spray coating, spin coating, and bar coating.

Examples of a method for removing at least a portion of the solvent contained in the application liquid include heating, pressure reduction, and a combination of heating and pressure reduction. One specific example of the method involves heat treatment (hot-air drying) using a high-temperature dryer or a reduced pressure dryer. The heat treatment is performed at a temperature of at least 40° C. and no greater than 150° C., for example. The heat treatment is performed for at least 3 minutes and no greater than 120 minutes, for example.

Note that the photosensitive member production method may further include either or both an intermediate layer formation process and a protective layer formation process as necessary. Any known method can be selected as appropriate as the intermediate layer formation process or the protective layer formation process.

EXAMPLES

The following provides further specific description of the present invention through use of Examples. However, the present invention is not limited to the scope of Examples.

<Preparation of Polyarylate Resins A to N and P>

Polyarylate resins A to I and P of Examples and polyarylate resins J to N of Comparative Examples were synthesized according to methods described below. The compositions of the respective polyarylate resins A to I, J to N, and P are shown in Table 5 below.

TABLE 5

| | Monomer | | | | | | | | | |
|---|---|---|---|---|---|---|---|---|---|---|
| | Bisphenol addition rate [%] | | | | Dicarboxylic acid addition rate [%] | | | | | |
| Formation Unit | BisCZ Unit (1-1) | BisB Unit (1-2) | BisZ Unit (1-3) | BP Unit (3) | 14NACC Unit (4) | 26NACC Unit (2-1) | DPEC Unit (2-2) | TPC/IPC Unit (TPC/IPC) | Terminator | Molecular weight |
| Resin A | 95 | — | — | 5 | 50 | 50 | — | — | DMP | 55400 |
| Resin B | — | 95 | — | 5 | 50 | 50 | — | — | DMP | 64200 |
| Resin C | 90 | — | — | 10 | 50 | 50 | — | — | DMP | 54500 |
| Resin D | 81 | — | — | 19 | 50 | 50 | — | — | DMP | 52700 |
| Resin E | — | 81 | — | 19 | 50 | 50 | — | — | DMP | 62300 |
| Resin F | 95 | — | — | 5 | 35 | 65 | — | — | DMP | 58000 |
| Resin G | 95 | — | — | 5 | 65 | 35 | — | — | DMP | 54300 |
| Resin H | 95 | — | — | 5 | 50 | 50 | — | — | PFH | 56800 |
| Resin I | 95 | — | — | 5 | 50 | — | 50 | — | DMP | 58500 |
| Resin P | 95 | — | — | 5 | 35 | — | 65 | — | DMP | 58900 |
| Resin J | 50 | — | — | 50 | 50 | 50 | — | — | DMP | Unmeasurable |
| Resin K | 100 | — | — | — | 50 | 50 | — | — | DMP | 55900 |
| Resin L | 95 | — | — | 5 | — | — | — | 50/50 | DMP | 50200 |
| Resin M | — | — | 80 | 20 | — | — | 100 | — | DMP | Unmeasurable |
| Resin N | 100 | — | — | — | — | 50 | 50 | — | DMP | 57300 |

In Table 5, “BisCZ”, “BisB”, “BisZ”, “BP”, “14NACC”, “26NACC”, “DPEC”, “TPC”, and “JP” respectively represent compounds represented by the following formulas (BisCZ), (BisB), (BisZ), (BP), (14NACC), (26NACC), (DPEC), (TPC), and (IPC) (also referred to below as compounds (BisCZ), (BisB), (BisZ), (BP), (14NACC), (26NACC), (DPEC), (TPC), and (IPC), respectively).

[Chemical Formula 17]

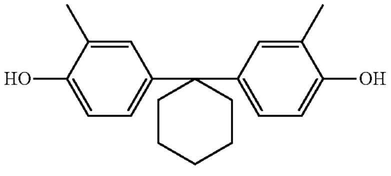

(BisCZ)

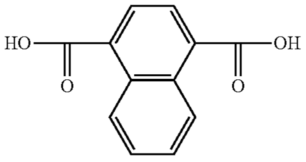

(14NACC)

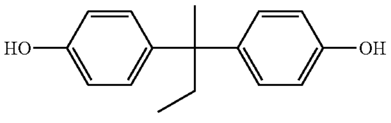

(BisB)

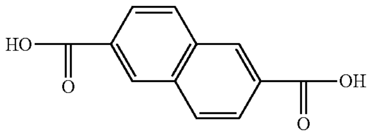

(26NACC)

-continued

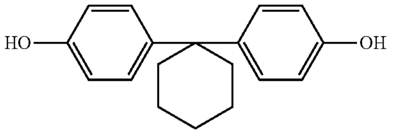

(BisZ)

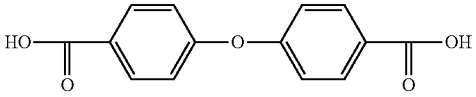

(DPEC)

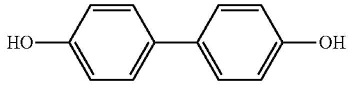

(BP)

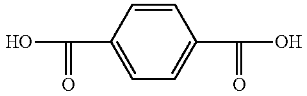

(TCP)

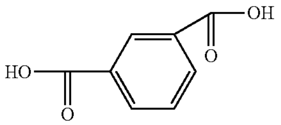

(IPC)

Furthermore, the terms in Table 5 means as follows.

Monomer: monomer used for synthesis of corresponding polyarylate resin

Formation unit: repeating unit formed from corresponding monomer

Resin: polyarylate resin

Bisphenol addition rate: percentage (unit: %) of amount (unit: mol) of corresponding bisphenol monomer added relative to total amount (unit: mol) of bisphenol monomer(s) added in synthesis of corresponding polyarylate resin Dicarboxylic acid addition rate: percentage (unit: %) of amount (unit: mol) of corresponding dicarboxylic acid monomer added relative to total amount (unit: mol) of dicarboxylic acid monomers added in synthesis of corresponding polyarylate resin Molecular weight: viscosity average molecular weight Unit: repeating unit TPC/IPC: mixture of compounds (TPC) and (IPC) with a molar ratio of 1/1

50/50 in column TPC/IPC: dicarboxylic acid addition rate of compound (TPC) is 50% and dicarboxylic acid addition rate of compound (IPC) is 50%

DMP: 2,6-dimethylphenol

PFH: 1H,1H-perfluoro-1-heptanol

Unmeasurable: viscosity average molecular weight was not measurable because polyarylate resin did not dissolve in solvent for viscosity molecular weight measurement.

(Synthesis of Polyarylate Resin A)

A three-necked flask equipped with a thermometer, a three-way cock, and a dropping funnel was used as a reaction vessel. The compound (BisCZ) (38.95 mmol) being a monomer, the compound (BP) (2.05 mmol) being a monomer, 2,6-dimethylphenol (0.413 mmol) being a terminator, sodium hydroxide (98 mmol), and benzyltributylammonium chloride (0.384 mmol) were added into the reaction vessel. The reaction vessel was purged with an argon gas. Water (300 mL) was added to the contents of the reaction vessel. The contents of the reaction vessel were stirred at 50° C. for 1 hour. The contents of the reaction vessel were cooled to 10° C. Through the above, an alkaline aqueous solution S-A was yielded.

Next, dicarboxylic acid dichloride (16.0 mmol) of the compound (14NACC) being a monomer and dicarboxylic acid dichloride (16.0 mmol) of the compound (26NACC) being a monomer were dissolved in chloroform solution (150 mL). This yielded a chloroform solution S-B.

The chloroform solution S-B was gradually dripped into the alkaline aqueous solution S-A over 110 minutes using a dropping funnel. The contents of the reaction vessel were stirred for 4 hours while the temperature (liquid temperature) of the contents of the reaction vessel was adjusted to 15±5° C. to allow a polymerization reaction to proceed. The upper layer (water layer) of the contents of the reaction vessel was removed by decantation, thereby obtaining an organic layer. Next, ion exchange water (400 mL) was added into a conical flask. The resultant organic layer was additionally added into the conical flask. Chloroform (400 mL) and acetic acid (2 mL) were additionally added into the conical flask. The contents of the conical flask were stirred at room temperature (25° C.) for 30 minutes. The upper layer (water layer) of the contents of the conical flask was removed by decantation, thereby obtaining an organic layer. The obtained organic layer was washed with ion exchange water (1 L) using a separatory funnel. The washing with ion exchange water was repeated 5 times to obtain a washed organic layer. Next, the washed organic layer was filtered to obtain a filtrate. The resultant filtrate was gradually dripped into methanol (1 L), thereby yielding a precipitate. The precipitate was taken out by filtration. The resultant precipitate was vacuum dried at a temperature of 70° C. for 12 hours. As a result, a polyarylate resin A was obtained.

(Synthesis of Polyarylate Resins B to I, J to N, and P)

Polyarylate resins B to I, J to N, and P were synthesized according to the same method as that for synthesis of the polyarylate resin A in all aspects other than use of the monomers shown in Table 5 at respective addition rates shown in Table 5. Note that in synthesis of each of the polyarylate resins, the amount(s) of the bisphenol monomer(s) added was/were set so that the total amount of the bisphenol monomer(s) was 41.0 mmol and the bisphenol monomer(s) each had a corresponding one of the bisphenol addition rates shown in Table 5. For example, in synthesis of the polyarylate resin B, the amount of the compound (BisB) added was 38.95 mmol (=41.0×95/100) and the amount of the compound (BP) added was 2.05 mmol (=41.0×5/100). Also, the amounts of the dicarboxylic acid monomers added were set so that the total amount of the dicarboxylic acid monomers was 32.0 mmol and the dicarboxylic acid monomers each had a corresponding one of the dicarboxylic acid monomer addition rates shown in Table 5. For example, in synthesis of the polyarylate resin B, the amount of the compound (14NACC) added was 16.0 mmol (=32.0×50/100), and the amount of the compound (26NACC) added was 16.0 mmol (=32.0×50/100).

Figure 7:
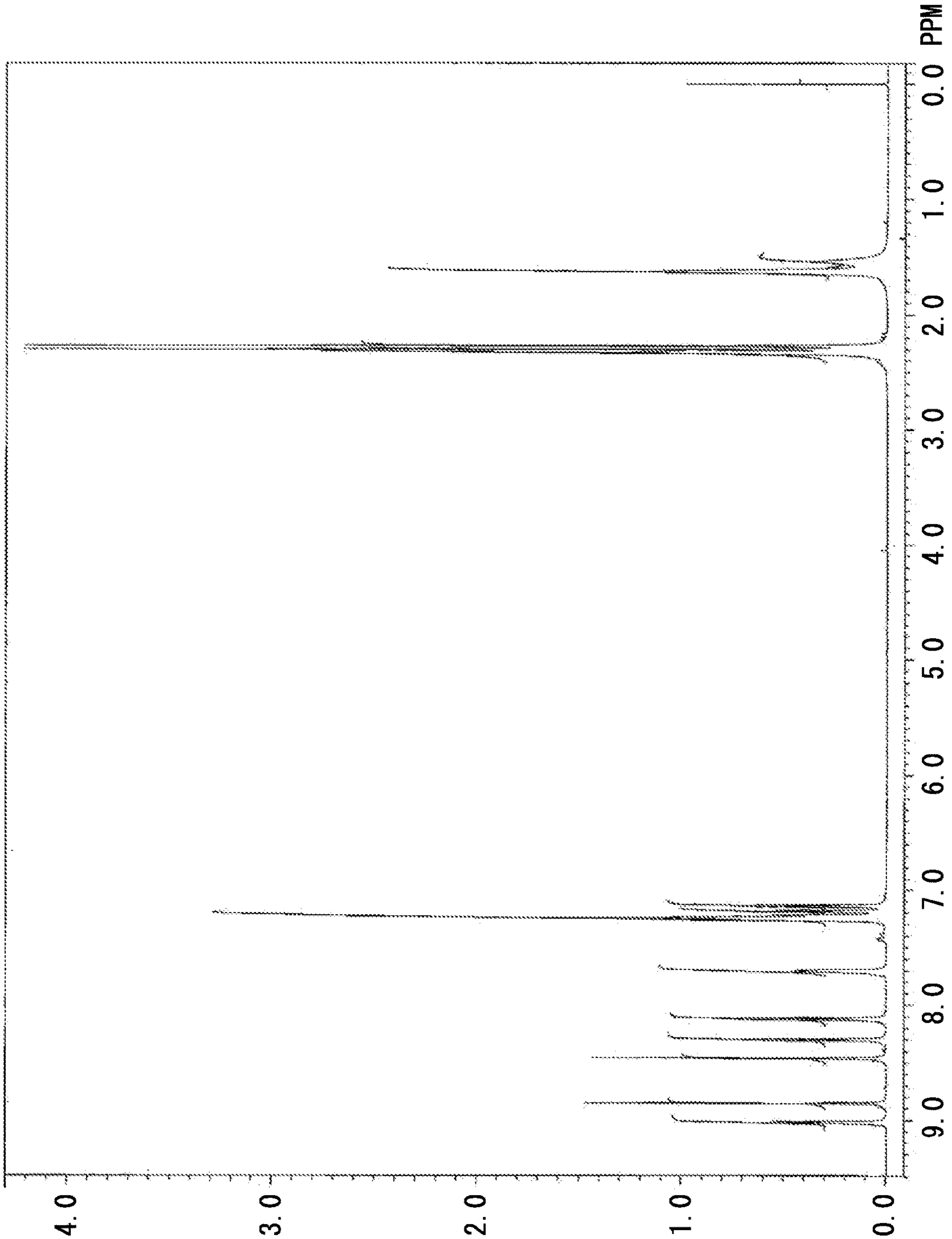
FIG. 7 is a $^{1}$H-NMR spectrum of a polyarylate resin H.

Each $^1$H-NMR spectrum of the resultant polyarylate resins A to I, J to N, and P was plotted using a proton nuclear magnetic resonance spectrometer (product of JEOL Ltd., 600 MHz). Deuterated chloroform was used as a solvent. Tetramethylsilane (TMS) was used as an internal standard sample. The $^1$H-NMR spectrum of the polyarylate resin H is shown in FIG. 7 as a typical example of the polyarylate resins A to I, J to N, and P. It was confirmed from the chemical shift read from the $^1$H-NMR spectrum that the polyarylate resin H has been obtained. With respect to the polyarylate resins A to G, I, J to N, and P, it was also confirmed by the same method as above that the polyarylate resins A to G, I, J to N, and P have been obtained.

<Preparation of Polyarylate Resin O>

A polyarylate resin O of Comparative Example was prepared. The polyarylate resin O was represented by the following formula (O). In formula (O), the number attached to the lower right of each repeating unit derived from a bisphenol indicates the percentage (unit: %) of the number of repeats of the repeating unit derived from the corresponding bisphenol relative to the total number of repeats of the respective repeating units derived from bisphenols included in the polyarylate resin O. Also, the number attached to the lower right of each repeating unit derived from a dicarboxylic acid in formula (O) indicates the percentage (unit: %) of the number of repeats of the repeating unit derived from the corresponding dicarboxylic acid relative to the total number of repeats of the respective repeating units derived from dicarboxylic acids included in the polyarylate resin O. The polyarylate resin O had an end group derived from 2,6-dimethylphenol as an end group. The polyarylate resin O had a viscosity average molecular weight of 54,400.

[Chemical Formula 18]

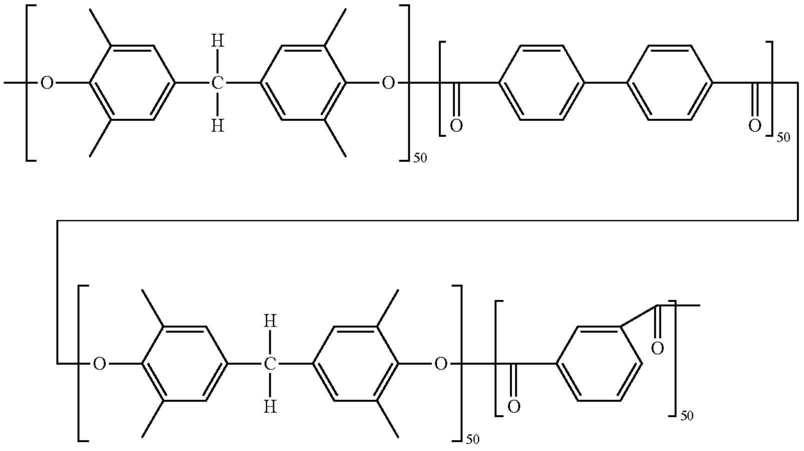

(O)

<Viscosity Average Molecular Weight Measurement>

The viscosity average molecular weight of each polyarylate resin was measured in accordance with the Japanese Industrial Standards (JIS) K7252-1:2016. The measured viscosity average molecular weights are shown in Table 5.

<Multi-Layer Photosensitive Member Production>

(Production of Multi-Layer Photosensitive Member (A-1))

First, an intermediate layer was formed. Surface treated titanium oxide ("test sample SMT-A", product of Tayca Corporation, number average primary particle diameter 10 nm) was prepared. SMT-A was a substance obtained in a manner that titanium oxide was surface treated with alumina and silica and the surface treated titanium oxide was further surface treated with methyl hydrogen polysiloxane under wet dispersion thereof. Next, 2 parts by mass of SMT-A, 1 part by mass of a polyamide resin ("AMILAN (registered Japanese trademark) CM8000", product of Toray Industries, Inc., quaternary copolymerized polyamide resin of polyamide 6, polyamide 12, polyamide 66, and polyamide 610), 10 parts by mass of methanol, 1 part by mass of butanol, and 1 part by mass of toluene were mixed for 5 hours using a bead mill, thereby yielding an application liquid for intermediate layer formation. The resultant application liquid for intermediate layer formation was filtered using a filter with a pore size of 5 μm. Thereafter, the application liquid for intermediate layer formation was applied onto the surface of a conductive substrate by dip coating. The conductive substrate used was a drum-shaped aluminum support. Subsequently, the applied application liquid for intermediate layer formation was dried at 130° C. for 30 minutes, thereby forming an intermediate layer (film thickness: 1 μm) on the conductive substrate.

Next, a charge transport layer was formed. In detail, 1.5 parts by mass of Y-form titanyl phthalocyanine being a charge generating material, 1.0 part by mass of a polyvinyl acetal resin ("S-LEC BX-5", product of SEKISUI CHEMICAL CO., LTD.) being a base resin, 40.0 parts by mass of propylene glycol monomethyl ether, and 40.0 parts by mass of tetrahydrofuran were mixed for 2 hours using a bead mill, thereby yielding an application liquid for charge generating layer formation. The resultant application liquid for charge generating layer formation was filtered using a filter with a pore size of 3 μm. The resultant filtrate was applied onto the intermediate layer by dip coating and dried at 50° C. for 5 minutes. Through the above processes, a charge generating layer (film thickness: 0.3 μm) was formed on the intermediate layer.

Next, a charge transport layer was formed. In detail, 50.00 parts by mass of the hole transport material (HTM-1), 100.00 parts by mass of the polyarylate resin F being a binder resin, 5.00 parts by mass of meta-terphenyl, 0.05 parts by mass of a silicone oil ("KF96-50cs", product of Shin-Etsu Chemical Co., Ltd., silicon oil with dimethylpolysiloxane structure), 595.00 parts by mass of tetrahydrofuran, and 105.00 parts by mass of toluene were mixed, thereby yielding an application liquid for charge transport layer formation. The resultant application liquid for charge transport layer formation was applied onto the charge generating layer by dip coating and dried for 70 minutes using an oven. The conditions for heating using the oven included a start temperature of 60° C., a final temperature reached of 130° C., and a heating rate of 1° C./min. A charge transport layer (film thickness: 20 μm) was formed on the charge generating layer. In the manner as described above, a multi-layer photosensitive member (A-1) was obtained. The multi-layer photosensitive member (A-1) included the intermediate layer on the conductive substrate, the charge generating layer on the intermediate layer, and the charge transport layer on the charge generating layer.

(Production of Multi-Layer Photosensitive Members (A-2) to (A-15) and (B-1) to (B-6))

Multi-layer photosensitive members (A-2) to (A-15) and (B-1) to (B-6) were produced according to the same method as that for producing the multi-layer photosensitive member (A-1) in all aspects other than use of the hole transport materials and the polyarylate resins shown in Table 7.

<Evaluation of Solubility in Solvent>

With respect to each of the polyarylate resins A to O, 3 g of the polyarylate resin and tetrahydrofuran in an amount such as to bring the concentration of the polyarylate resin to 15% by mass were stirred for 60 minutes in an environment at a temperature of 22° C., thereby yielding an evaluation liquid. The evaluation liquid was visually observed to evaluate solubility of the polyarylate resin in the tetrahydrofuran being a solvent according to the following criteria. A polyarylate resin evaluated as A or B was determined to have excellent solubility in the solvent, and a polyarylate resin evaluated as C was determined to be poor in solubility in the solvent. Evaluation results of the polyarylate resins are shown in Table 6.

(Evaluation Criteria of Solubility in Solvent)

A: polyarylate resin was completely dissolved in tetrahydrofuran and neither white turbidity nor gelation of evaluation liquid was observed.

B: white turbidity of evaluation liquid was observed while gelation of evaluation liquid was not observed.

C: gelation of evaluation liquid was observed.

<Evaluation of Chargeability>

Chargeability of each of the multi-layer photosensitive members was evaluated in an environment at a temperature of 25° C. and a relative humidity of 50%. In detail, the surface of the photosensitive member was charged using a drum sensitivity test device (product of GENTEC CO., LTD.) under conditions of a charging current flowing in a charger of −10 ρA and a rotational speed of the photosensitive member of 31 rpm. The surface potential of the photosensitive member was measured after the charging. The measured surface potential was taken to be a charge potential ($V_0$, unit: −V) of the photosensitive member. The charge potentials of the photosensitive members are shown in Table 7. It is determined that the photosensitive member has chargeability sufficient for actual use if the charge potential is at least −700 V and no greater than −650 V.

<Evaluation of Initial Sensitivity and Repetitive Sensitivity>

Sensitivity of each of the photosensitive members was evaluated in an environment at a temperature of 25° C. and a relative humidity of 50%. In detail, charging and light exposure were repetitively performed on the photosensitive member using a drum sensitivity test device (product of GENTEC CO., LTD.) while the photosensitive member was rotated. The charging condition was a condition under which the surface potential of the photosensitive member was −600 V. Furthermore, the light exposure condition was a condition that the surface of the photosensitive member was irradiated with monochromatic light (wavelength: 780 nm, amount of light exposure: 0.8 μJ/cm$^2$) taken out of light of a halogen lamp using a bandpass filter. The surface potential of the photosensitive member at a time when 80 milliseconds have elapsed from the light exposure (irradiation with the monochromatic light) at tenth rotation of the photosensitive member was measured and taken to be a post-exposure potential ($V_L$, unit: −V) at the tenth rotation. Furthermore, the surface potential of the photosensitive member at a time when 80 milliseconds have elapsed from the light exposure (irradiation with the monochromatic light) at 1860th rotation of the photosensitive member was measured and taken to be a post-exposure potential ($V_L$, unit: −V) at the 1860th rotation. The post-exposure potentials at tenth rotation and 1860th rotation of each photosensitive member are shown in Table 7. Initial sensitivity of the photosensitive member was evaluated from the post-exposure potential at the tenth rotation according to the following criteria. Also, repetitive sensitivity of the photosensitive member was evaluated from the post-exposure potential at the 1860th rotation according to the following criteria.

(Evaluation Criteria of Initial Sensitivity)

Good: absolute value of post-exposure potential at tenth rotation of no greater than 90 V Poor: absolute value of post-exposure potential at tenth rotation of greater than 90 V (Evaluation Criteria of Repetitive Sensitivity)

Good: absolute value of post-exposure potential at 1860th rotation of no greater than 130 V Poor: absolute value of post-exposure potential at 1860th rotation of greater than 130 V <Evaluation of Abrasion Resistance>

The application liquid for charge transport layer formation prepared in <Multi-layer Photosensitive Member Production> described above was applied onto a polypropylene sheet (thickness: 0.3 mm) wound around an aluminum pipe (diameter: 78 mm). The applied application liquid for charge transport layer formation was dried for 70 minutes using an oven. The conditions for the heating using the oven included a start temperature of 60° C., a final temperature reached of 130° C., and a heating rate of 1° C./min. The drying formed a charge transport layer (film thickness 30 μm) on the polypropylene sheet. Subsequently, the charge transport layer was peeled off from the polypropylene sheet. The peeled charge transport layer was attached to a card-shaped member ("S-36", product of TABER Industries). A mass $M_A$ of the card-shaped member with the charge transport layer attached thereto was measured. Subsequently, the card-shaped member was mounted on a turntable of a rotary abration tester (product of Toyo Seiki Seisaku-sho, Ltd.). Then, the turntable was rotated 1000 times at a rotational speed of 60 rpm with a wear ring ("CS-10", product of TABER Industries) with a load of 500 gf placed on the photosensitive layer on the card-shaped member. The charge transport layer on the turntable was abraded in the manner described above. A mass $M_B$ of the card-shaped member with the charge transport layer attached thereto was measured again after the abrasion. Thereafter, an abrasion loss ($=M_A-M_B$, unit: mg) being a change in mass of the charge transport layer between before and after the abrasion was obtained. The measured abrasion losses are shown in Table 7. Abrasion resistance of each photosensitive member was evaluated from a corresponding abrasion loss according to the following criteria.

(Evaluation Criteria of Abrasion Resistance)

Good: abrasion loss of no greater than 7.5 mg

Poor: abrasion loss of greater than 7.5 mg

In Table 6, "Resin" means polyarylate resin and "Solubility" means evaluation of solubility in the solvent. The terms in Table 7 means as follows. "Photosensitive member" means a multi-layer photosensitive member. "HTM" means a hole transport material. "Resin" means a polyarylate resin. "Chargeability" means evaluation of chargeability. "Sensitivity" means evaluation of sensitivity. "$V_0$" means a charge potential. "$V_L$" in the column titled "10th rotation" means a post-exposure potential of a corresponding photosensitive member at the tenth rotation. "$V_L$" in the column titled "1860th rotation" means a post-exposure potential of a corresponding photosensitive member at the 1860th rotation. "Application liquid preparation impossible" means the fact that it was impossible to prepare an application liquid for charge transport layer formation due to insolubility of a corresponding polyarylate resin in the solvent for preparing the application liquid for charge transport layer formation.

TABLE 6

| Resin | Solubility |
|---|---|
| A | A |
| B | A |
| C | A |
| D | A |
| E | A |
| F | A |
| G | A |
| H | A |

TABLE 6-continued

| Resin | Solubility |
|---|---|
| I | A |
| P | A |
| J | C |
| K | A |
| L | A |
| M | C |
| N | A |
| O | A |

solvent as shown in Table 6. As also shown in Table 7, repetitive sensitivity and abrasion resistance of a photosensitive member with a photosensitive layer containing any of the polyarylate resins A to I and P were increased. As also shown in Table 7, repetitive sensitivity and abrasion resistance of a photosensitive member with a photosensitive layer containing any of the polyarylate resins A to I and P were increased without reduction in chargeability and initial sensitivity.

It was demonstrated from the above that the polyarylate resin according to the present invention that encompasses the polyarylate resins A to I and P has excellent solubility in

TABLE 7

| | Photosensitive member | HTM | Resin | Chargeability $V_0$ [−V] | Sensitivity 10th rotation $V_L$ [−V] | Sensitivity 1860th rotation $V_L$ [−V] | Abrasion resistance Abrasion loss [mg] |
|---|---|---|---|---|---|---|---|
| Example 1 | A-1 | HTM-1 | A | 678 | 75 | 114 | 6.2 |
| Example 2 | A-2 | HTM-2 | A | 683 | 72 | 114 | 6.6 |
| Example 3 | A-3 | HTM-3 | A | 680 | 67 | 110 | 6.7 |
| Example 4 | A-4 | HTM-4 | A | 659 | 63 | 103 | 6.2 |
| Example 5 | A-5 | HTM-5 | A | 666 | 61 | 108 | 6.4 |
| Example 6 | A-6 | HTM-6 | A | 680 | 82 | 120 | 6.6 |
| Example 7 | A-7 | HTM-5 | B | 682 | 62 | 129 | 4.2 |
| Example 8 | A-8 | HTM-5 | C | 674 | 63 | 108 | 5.9 |
| Example 9 | A-9 | HTM-5 | D | 681 | 64 | 130 | 5.6 |
| Example 10 | A-10 | HTM-5 | E | 682 | 67 | 128 | 4.0 |
| Example 11 | A-11 | HTM-5 | F | 686 | 63 | 106 | 5.9 |
| Example 12 | A-12 | HTM-5 | G | 675 | 64 | 107 | 6.8 |
| Example 13 | A-13 | HTM-5 | H | 680 | 66 | 95 | 5.5 |
| Example 14 | A-14 | HTM-5 | I | 677 | 68 | 87 | 7.5 |
| Example 15 | A-15 | HTM-5 | P | 680 | 60 | 80 | 5.7 |
| Comparative Example 1 | B-1 | HTM-5 | J | Application liquid preparation impossible | | | |
| Comparative Example 2 | B-2 | HTM-5 | K | 684 | 56 | 119 | 8.0 |
| Comparative Example 3 | B-3 | HTM-5 | L | 678 | 58 | 98 | 17.4 |
| Comparative Example 4 | B-4 | HTM-5 | M | Application liquid preparation impossible | | | |
| Comparative Example 5 | B-5 | HTM-5 | N | 694 | 79 | 134 | 7.2 |
| Comparative Example 6 | B-6 | HTM-5 | O | 680 | 80 | 157 | 15.3 |

As can be understood from Table 5, the polyarylate resins J to N each were not a polyarylate resin encompassed in the polyarylate resin (PA). As can be also understood from formula (O), the polyarylate resin O was not a polyarylate resin encompassed in the polyarylate resin (PA). Therefore, the polyarylate resins J and M had poor solubility in the solvent and an application liquid for charge transport layer formation was not prepared with the polyarylate resins J and M with a result that a photosensitive layer (more specifically, a charge transport layer) was not formed as shown in Tables 6 and 7. As also shown in Table 7, abrasion resistance of a photosensitive member with a photosensitive layer containing either the polyarylate resin K or L was not increased. As also shown in Table 7, repetitive sensitivity of a photosensitive member with a photosensitive layer containing the polyarylate resin N was not increased. As also shown in Table 7, abrasion resistance and repetitive sensitivity of a photosensitive member with a photosensitive layer containing the polyarylate resin O were not increased.

By contrast, as can be understood from Table 5, the polyarylate resins A to I and P each were a polyarylate resin encompassed in the polyarylate resin (PA). Therefore, the polyarylate resins A to I and P had excellent solubility in the solvent and a photosensitive member can have increased repetitive sensitivity and abrasion resistance when a photosensitive layer thereof contained the polyarylate resin. Furthermore, it was demonstrated that the photosensitive member according to the present invention that encompasses the multi-layer photosensitive members (A-1) to (A-15) can include a favorably formed photosensitive layer and can have increased repetitive sensitivity and abrasion resistance.

INDUSTRIAL APPLICABILITY

The photosensitive member according to the present invention can be used in image forming apparatuses.

The invention claimed is:

1. A polyarylate resin comprising repeating units represented by formulas (1), (2), (3), and (4), wherein a percentage of a number of repeats of the repeating unit represented by the formula (3) relative to a total number of repeats of the respective repeating units represented by the formulas (1) and (3) is greater than 0% and less than 20%,

[Chemical Formula 1]

(1)

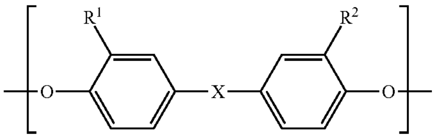

(2)

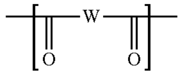

(3)

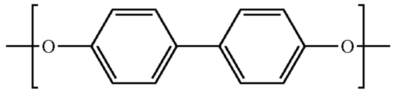

(4)

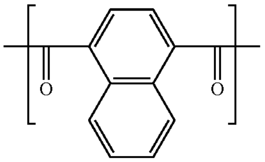

where in the formula (1), $R^1$ and $R^2$ each represent, independently of one another, a hydrogen atom or a methyl group and X represents a divalent group represented by formula (X1) or (X2), and in the formula (2), W represents a divalent group represented by formula (W1) or (W2),

[Chemical Formula 2]

(X1)

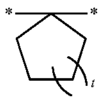

(X2)

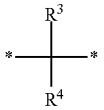

where in the formula (X1), t represents an integer of at least 1 and no greater than 3 and * represents a bond, and in the formula (X2), $R^3$ and $R^4$ each represent a hydrogen atom or an alkyl group with a carbon number of at least 1 and no greater than 4, $R^3$ and $R^4$ represent groups different from each other, and * represents a bond, and

[Chemical Formula 3]

(W1)

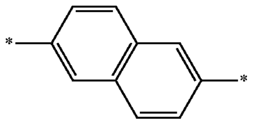

(W2)

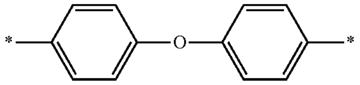

in the formulas (W1) and (W2), * represents a bond.

2. The polyarylate resin according to claim 1, wherein in the formula (1), $R^1$ and $R^2$ each represent a methyl group and X represents a divalent group represented by the formula (X1).

3. The polyarylate resin according to claim 1, wherein the repeating unit represented by the formula (1) is a repeating unit represented by formula (1-1):

[Chemical Formula 4]

(1-1)

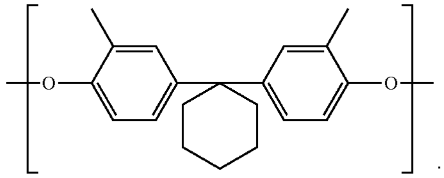

4. The polyarylate resin according to claim 1, wherein the repeating unit represented by the formula (1) is a repeating unit represented by formula (1-1), and the repeating unit represented by the formula (2) is a repeating unit represented by formula (2-1):

[Chemical Formula 5]

(1-1)

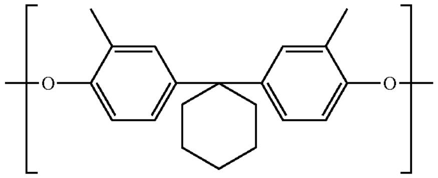

(2-1)

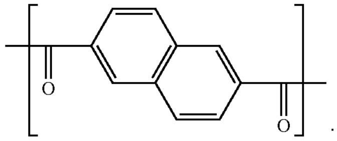

5. The polyarylate resin according to claim 1, wherein the repeating unit represented by the formula (1) is a repeating unit represented by formula (1-1), and the repeating unit represented by the formula (2) is a repeating unit represented by formula (2-2):

[Chemical Formula 6]

(1-1)

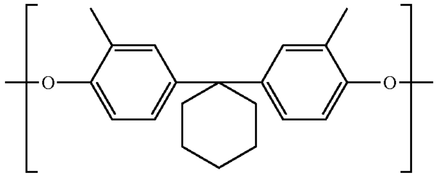

(2-2)

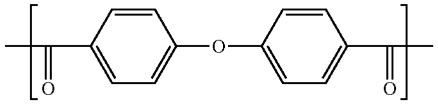

6. The polyarylate resin according to claim 1, wherein in the formula (1), $R^1$ and $R^2$ each represent a hydrogen atom and X represents a divalent group represented by the formula (X2).

7. The polyarylate resin according to claim 1, wherein the repeating unit represented by the formula (1) is a repeating unit represented by formula (1-2):

[Chemical Formula 7]

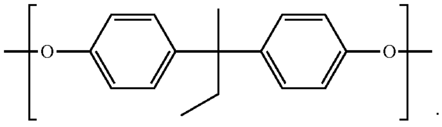

8. The polyarylate resin according to claim 1, wherein the repeating unit represented by the formula (1) is a repeating unit represented by formula (1-2), and the repeating unit represented by the formula (2) is a repeating unit represented by formula (2-1):

[Chemical Formula 9]

[Chemical Formula 8]

(1-2)

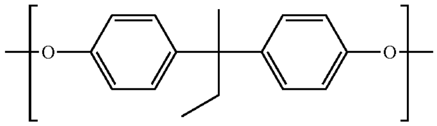

(2-1)

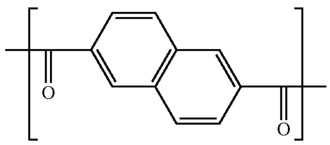

9. An electrophotographic photosensitive member comprising:

a conductive substrate; and a photosensitive layer, wherein the photosensitive layer contains a charge generating material, a hole transport material, and a binder resin, and the binder resin includes the polyarylate resin according to claim 1.

10. The electrophotographic photosensitive member according to claim 9, wherein the hole transport material includes a compound represented by formula (20), (21), or (22):

(20)

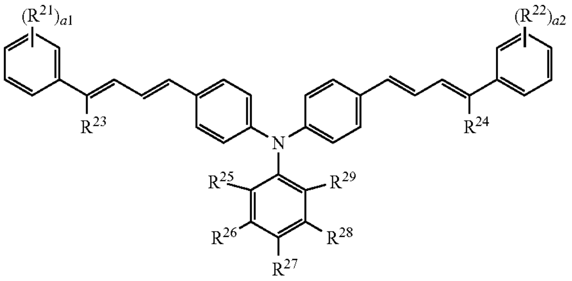

(21)

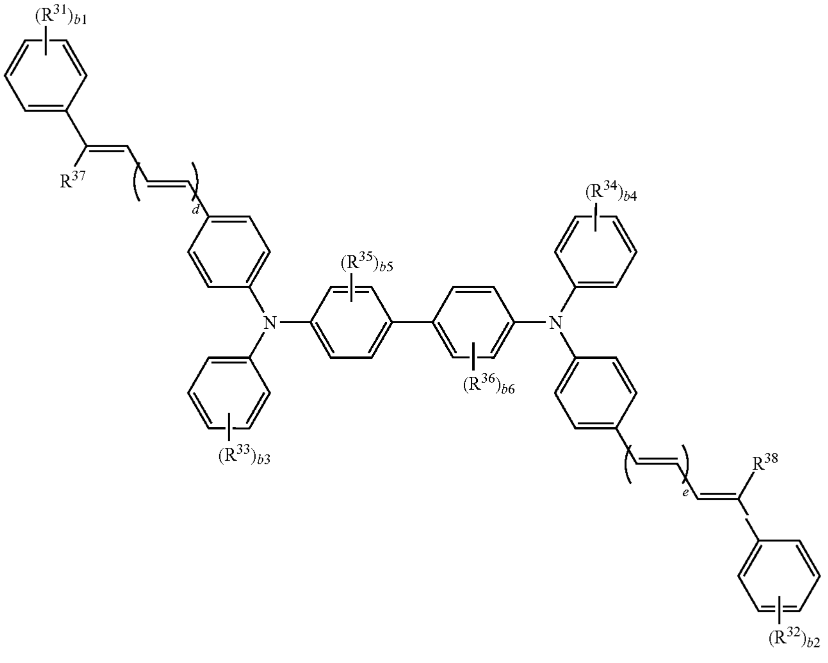

-continued (22)

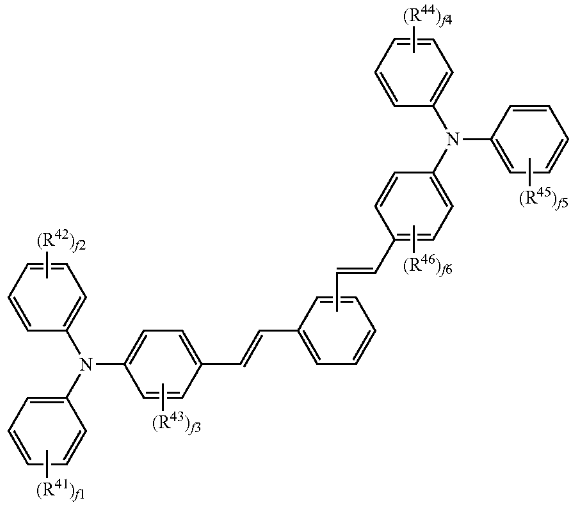

where in the formula (20): $R^{21}$ and $R^{22}$ each represent, independently of one another, a phenyl group, an alkyl group with a carbon number of at least 1 and no greater than 8, or an alkoxy group with a carbon number of at least 1 and no greater than 8; $R^{23}$ to $R^{29}$ each represent, independently of one another, a hydrogen atom, an alkyl group with a carbon number of at least 1 and no greater than 8, a phenyl group optionally substituted with an alkyl group with a carbon number of at least 1 and no greater than 8, or an alkoxy group with a carbon number of at least 1 and no greater than 8; any adjacent two of chemical groups $R^{21}$ to $R^{29}$ may be bonded to form a ring; and a1 and a2 each represent, independently of one another, an integer of at least 0 and no greater than 5, in the formula (21): $R^{31}$ to $R^{36}$ each represent, independently of one another, a phenyl group or an alkyl group with a carbon number of at least 1 and no greater than 8; $R^{37}$ and $R^{38}$ each represent, independently of one another, a hydrogen atom, a phenyl group, or an alkyl group with a carbon number of at least 1 and no greater than 8; b1, b2, b3, and b4 each represent, independently of one another, an integer of at least 0 and no greater than 5; b5 and b6 each represent, independently of one another, an integer of at least 0 and no greater than 4; and d and e each represent, independently of one another, 0 or 1, and in the formula (22): $R^{41}$ to $R^{46}$ each represent, independently of one another, a phenyl group, an alkyl group with a carbon number of at least 1 and no greater than 8, or an alkoxy group with a carbon number of at least 1 and no greater than 8; f1, f2, f4, and f5 each represent, independently of one another, an integer of at least 0 and no greater than 5; and f3 and f6 each represent, independently of one another, an integer of at least 0 and no greater than 4.

11. The electrophotographic photosensitive member according to claim 9, wherein the hole transport material includes a compound represented by formula (HTM-1), (HTM-2), (HTM-3), (HTM-4), (HTM-5), or (HTM-6):

[Chemical Formula 10]

(HTM-1)

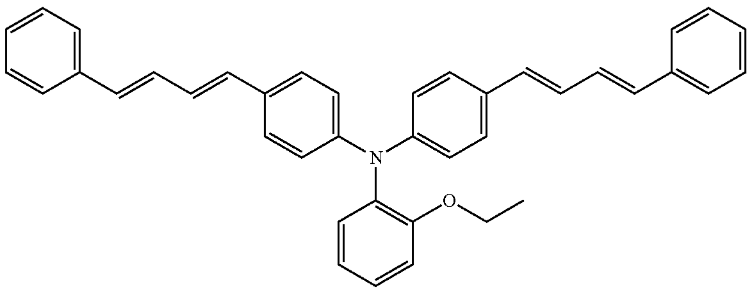

-continued
(HTM-2)
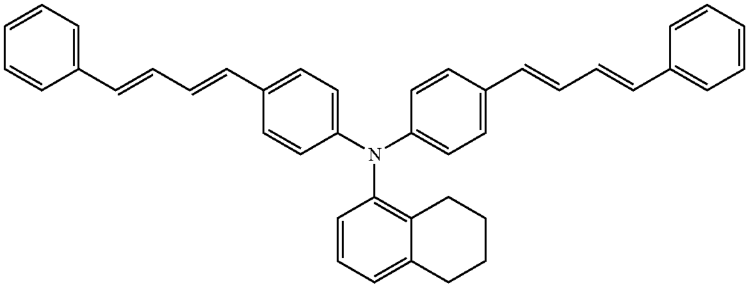
(HTM-3)
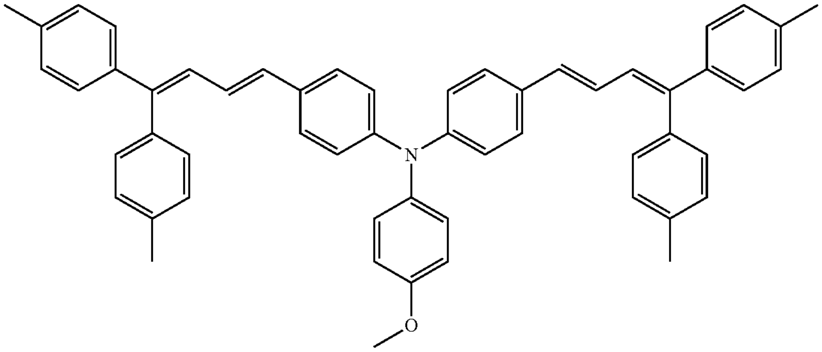
[Chemical Formula 11]
(HTM-4)
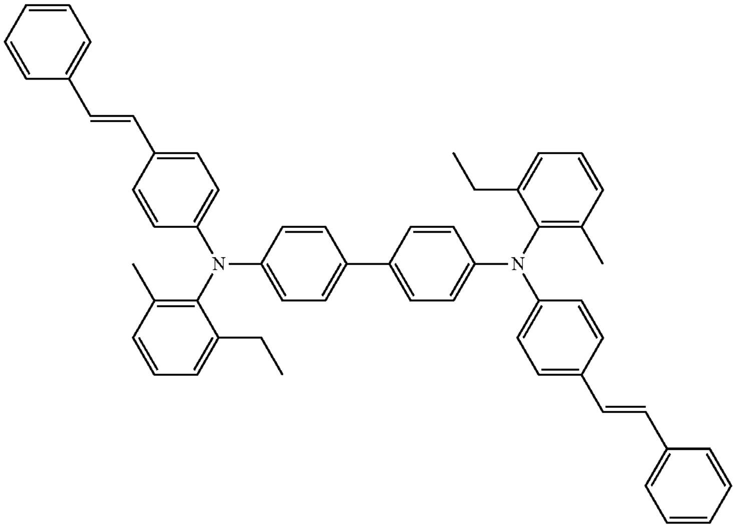

-continued
(HTM-5)
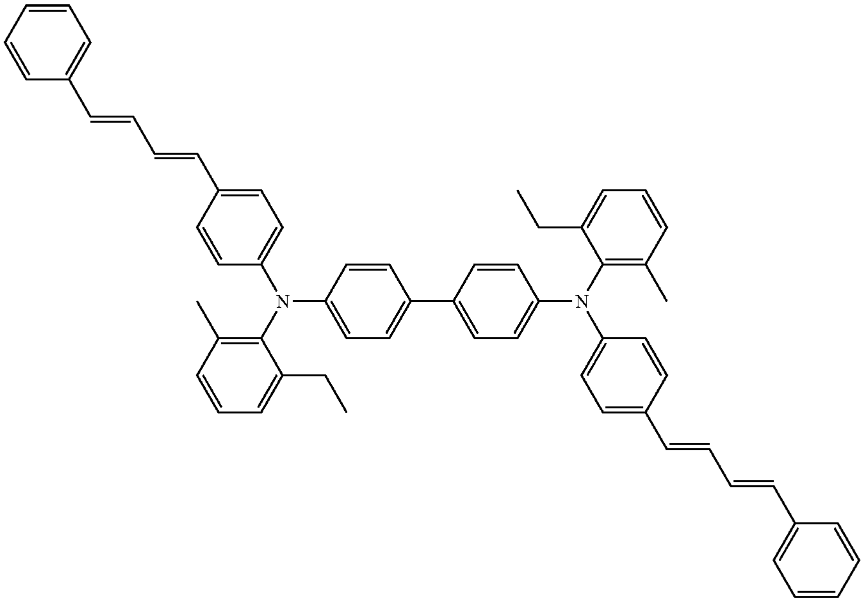
(HTM-6)
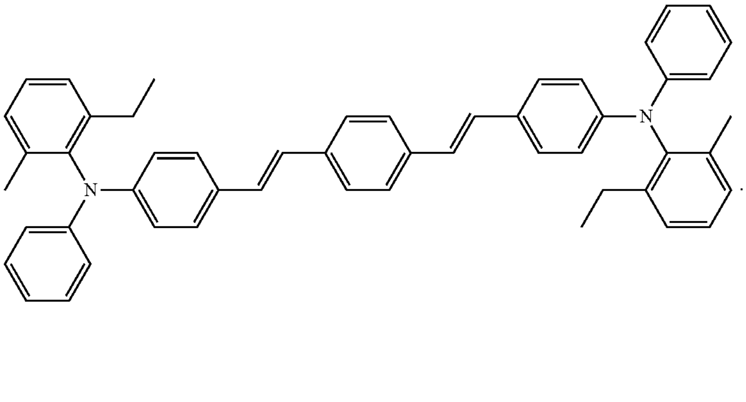

12. The electrophotographic photosensitive member according to claim 9, wherein the photosensitive layer includes a charge generating layer containing the charge generating material and a charge transport layer containing the hole transport material and the binder resin, and the charge transport layer is a single layer serving as an outermost layer.

* * * * *